United States Patent
Clark et al.

(10) Patent No.: US 9,933,247 B2
(45) Date of Patent: Apr. 3, 2018

(54) MANDREL CONFIGURATION MONITORING SYSTEM

(71) Applicant: The Boeing Company, Chicago, IL (US)

(72) Inventors: Don Michael Clark, Summerville, SC (US); Austin Michael Cangelosi, Charleston, SC (US); Li Chun Chang, Mt. Pleasant, SC (US); Deborah E. Errazo, Goose Creek, SC (US)

(73) Assignee: The Boeing Company, Chicago, IL (US)

( * ) Notice: Subject to any disclaimer, the term of this patent is extended or adjusted under 35 U.S.C. 154(b) by 909 days.

(21) Appl. No.: 14/153,529

(22) Filed: Jan. 13, 2014

(65) Prior Publication Data
US 2015/0198432 A1    Jul. 16, 2015

(51) Int. Cl.
| | |
|---|---|
| *G01B 11/00* | (2006.01) |
| *G01B 21/00* | (2006.01) |
| *G01S 13/00* | (2006.01) |
| *G05B 19/19* | (2006.01) |
| *G05B 19/402* | (2006.01) |

(52) U.S. Cl.
CPC ............. *G01B 11/00* (2013.01); *G01B 21/00* (2013.01); *G01S 13/00* (2013.01); *G05B 19/19* (2013.01); *G05B 19/402* (2013.01); *G05B 2219/31058* (2013.01); *G05B 2219/32223* (2013.01); *G05B 2219/37221* (2013.01); *G05B 2219/50132* (2013.01); *Y02P 90/04* (2015.11); *Y02P 90/22* (2015.11)

(58) Field of Classification Search
CPC ......... G01B 11/00; G01B 21/00; G01S 13/00; G05B 19/19; G05B 19/402
USPC .......................................................... 700/160
See application file for complete search history.

(56) References Cited

U.S. PATENT DOCUMENTS

| | | | | |
|---|---|---|---|---|
| 5,117,348 | A | * | 5/1992 | Romero ............... B29C 70/388 156/350 |
| 6,470,587 | B1 | | 10/2002 | Cunningham et al. |
| 6,484,381 | B2 | | 11/2002 | Cunningham et al. |
| 7,277,811 | B1 | * | 10/2007 | Marsh ................... B23Q 17/22 702/105 |
| 7,536,271 | B2 | | 5/2009 | Marsh et al. |
| 7,661,199 | B2 | | 2/2010 | Marsh et al. |
| 7,743,660 | B2 | | 6/2010 | Marsh et al. |
| 7,978,322 | B2 | | 7/2011 | Marsh et al. |

(Continued)

FOREIGN PATENT DOCUMENTS

EP    1170648 A1    1/2002

OTHER PUBLICATIONS

"Brochure on RFID-radar system: Identifying and locating low cost RFID transponders—'A new identification technology'," Trolley Scan (Pty) Ltd, Mar. 2013, 12 pages.

(Continued)

*Primary Examiner* — Michael D Masinick
*Assistant Examiner* — Sivalingham Sivanesan
(74) *Attorney, Agent, or Firm* — Miller, Matthias & Hull LLP

(57) ABSTRACT

A method and system for monitoring a mandrel. A first plurality of transmitting devices is positioned with respect to the mandrel. Signals from a portion of the first plurality of transmitting devices are received at a receiving device. The signals are processed to determine a configuration of the mandrel.

22 Claims, 15 Drawing Sheets

(56) References Cited

U.S. PATENT DOCUMENTS

| | | | | |
|---|---|---|---|---|
| 2006/0265914 A1* | 11/2006 | Gudat | ..................... | E02F 9/245 |
| | | | | 37/348 |
| 2007/0186603 A1* | 8/2007 | Hogendoorn | ............ | B21D 9/16 |
| | | | | 72/31.04 |
| 2008/0318683 A1 | 12/2008 | Rofougaran et al. | | |
| 2009/0039198 A1* | 2/2009 | Buckus | ................ | B64F 5/0009 |
| | | | | 244/99.3 |
| 2012/0268308 A1 | 10/2012 | Tuttle | | |

OTHER PUBLICATIONS

"RFID-radar gives precision long range measurement," Trolley Scan (Pty) Ltd, Version 4, Feb. 2008, 10 pages.
Han et al., "Improving Accuracy for 3D RFID Localization," Hindawi Publishing Corporation, International Journal of Distributed Sensor Networks, vol. 2012, Article ID 865184, 9 pages.
Hekimian-Williams et al., "Accurate Localization of RFID Tags Using Phase Difference," IEEE International Conference on RFID, Apr. 2010, pp. 89-96.
International Search Report and Written Opinion, dated Mar. 6, 2015 regarding Application No. PCT/US2014/065495, 13 pages.

\* cited by examiner

US 9,933,247 B2

MANDREL CONFIGURATION MONITORING SYSTEM

BACKGROUND INFORMATION

1. Field

The present disclosure relates generally to manufacturing and, in particular, to manufacturing parts for vehicles using a mandrel. Still more particularly, the present disclosure relates to a mandrel configuration monitoring system.

2. Background

Manufacturing parts for an aircraft is a complex and time-consuming process. Hundreds of thousands of parts may be designed and assembled to complete an aircraft.

Manufacturing different parts for the aircraft involves performing operations on the parts in forming the parts for use in manufacturing the aircraft. These operations may include, for example, without limitation, drilling, countersinking, fastening, coupling, sealing, coating, inspection, or other suitable types of operations. These operations may be performed by a tool such that each part is ready for assembly with other parts in the aircraft.

With composite parts, one or more layers of composite material are typically laid up on a mold. This mold may take the form of a mandrel. The different layers may be laid up in different orientations and different numbers of layers may be used for the composite part being manufactured.

After the different layers of composite material have been laid up on the mandrel, the layers of composite material may be consolidated and cured upon exposure to temperature and pressure, thus forming the composite part. Various operations may be performed on the composite layers after curing. For instance, holes may be drilled in the composite structure such that the composite part may be attached to a frame for a fuselage. As another example, a portion of the composite part may be cut out to form a door.

In manufacturing aircraft parts, guides are used to maintain a desired position for an aircraft part during manufacturing. With composite parts, the position of the composite part on the mandrel is important in forming features on the composite parts. For instance, a mechanical guide, or target, is sometimes used to maintain the desired position for a composite part during various stages of manufacturing. Targets may be used to determine a proper location to perform operations to form features on the composite part. In some cases, the features may be used to align the composite part with another composite part, a metal part, or some other suitable type of part. In other cases, these features are used to fasten parts together. These features may be, for example, holes, channels, slots, posts, and other suitable features that may be used to align composite parts with each other.

After manufacturing, parts are then assembled to form an aircraft. During the assembly of the aircraft, placement of parts relative to each other is important. For example, properly aligning one part with respect to another part allows assembly of the aircraft to be completed in an efficient manner. Precise locations of the features formed in the parts are needed for proper assembly. For instance, holes in two parts should align to properly fasten the parts together.

If parts are misaligned, however, undesired inconsistencies may occur. For example, if a hole is drilled in an undesired location, the part may not be fastened to another part in the assembly as desired. In another illustrative example, if a mandrel is deformed, the corresponding composite part also may be deformed.

Because the aircraft is made up of hundreds of thousands of parts, even small inconsistencies can result in parts being reworked or discarded. As a result, assembly of an aircraft may take more time than desired, the cost may be greater than desired, or both. Therefore, it would be desirable to have a method and apparatus that take into account at least some of the issues discussed above, as well as other possible issues.

SUMMARY

In one illustrative embodiment, a method for monitoring a mandrel is provided. A first plurality of transmitting devices is positioned with respect to the mandrel. Signals from a portion of the first plurality of transmitting devices are received at a receiving device. The signals are processed to determine a configuration of the mandrel.

In another illustrative embodiment, a system comprises a mandrel, a first plurality of transmitting devices physically associated with the mandrel, and a receiving device. The receiving device is configured to receive signals from a portion of the first plurality of transmitting devices.

In yet another illustrative embodiment, a method for monitoring a configuration of a mandrel is provided. A plurality of transceivers is attached to the mandrel. Signals from a portion of the plurality of transceivers are received at a receiving device. The signals are processed to determine the configuration of the mandrel. The configuration of the mandrel is compared to a desired configuration for the mandrel. The mandrel is determined whether to be replaced based on a comparison.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it is desirable to have a manufacturing system with an increased likelihood of producing parts with the correct specifications. The illustrative embodiments recognize and take into account, however, that during the manufacturing process, conditions in the manufacturing environment change. For example, without limitation, when a mandrel is used to form a part, the configuration of the mandrel may change after a number of uses. For instance, the mandrel may deform after a number of uses. A mandrel is a deformed mandrel when the change results in the mandrel having features that are out of tolerance.

The illustrative embodiments recognize and take into account that it is desirable to determine whether the configuration of the mandrel has changed in an undesired manner. Since parts that are formed on the mandrel often take the shape of the mandrel, in some cases, a deformed mandrel results in a part that may not be usable in an aircraft. If the part is not usable, the part is reworked or discarded.

The illustrative embodiments also recognize and take into account that the tools used to perform operations on the part may need to be controlled with a desired level of precision. In some cases, controlling the operation of the tool with the desired level of precision is difficult because the part may move while operations are performed by the tool. Accordingly, the position of the tool may be offset from the desired position by an amount greater than preferred.

The illustrative embodiments further recognize and take into account that it may be desirable to reduce unwanted movement of a part on a mandrel while operations are being performed on the part. The illustrative embodiments also recognize and take into account that real-time information about the configuration of at least one of the part, the mandrel, or the tool is desirable so that an operator may adjust these structures to reduce the number of parts that need to be reworked or discarded. For instance, the part may need to be adjusted such that holes are drilled properly for the assembly of the aircraft.

Thus, the illustrative embodiments provide a method and apparatus for monitoring a configuration of a mandrel. A first plurality of transmitting devices is positioned with respect to the mandrel. Signals from a portion of the first plurality of transmitting devices are received at a receiving device. The signals are processed to determine the configuration of the mandrel.

Figure 1:
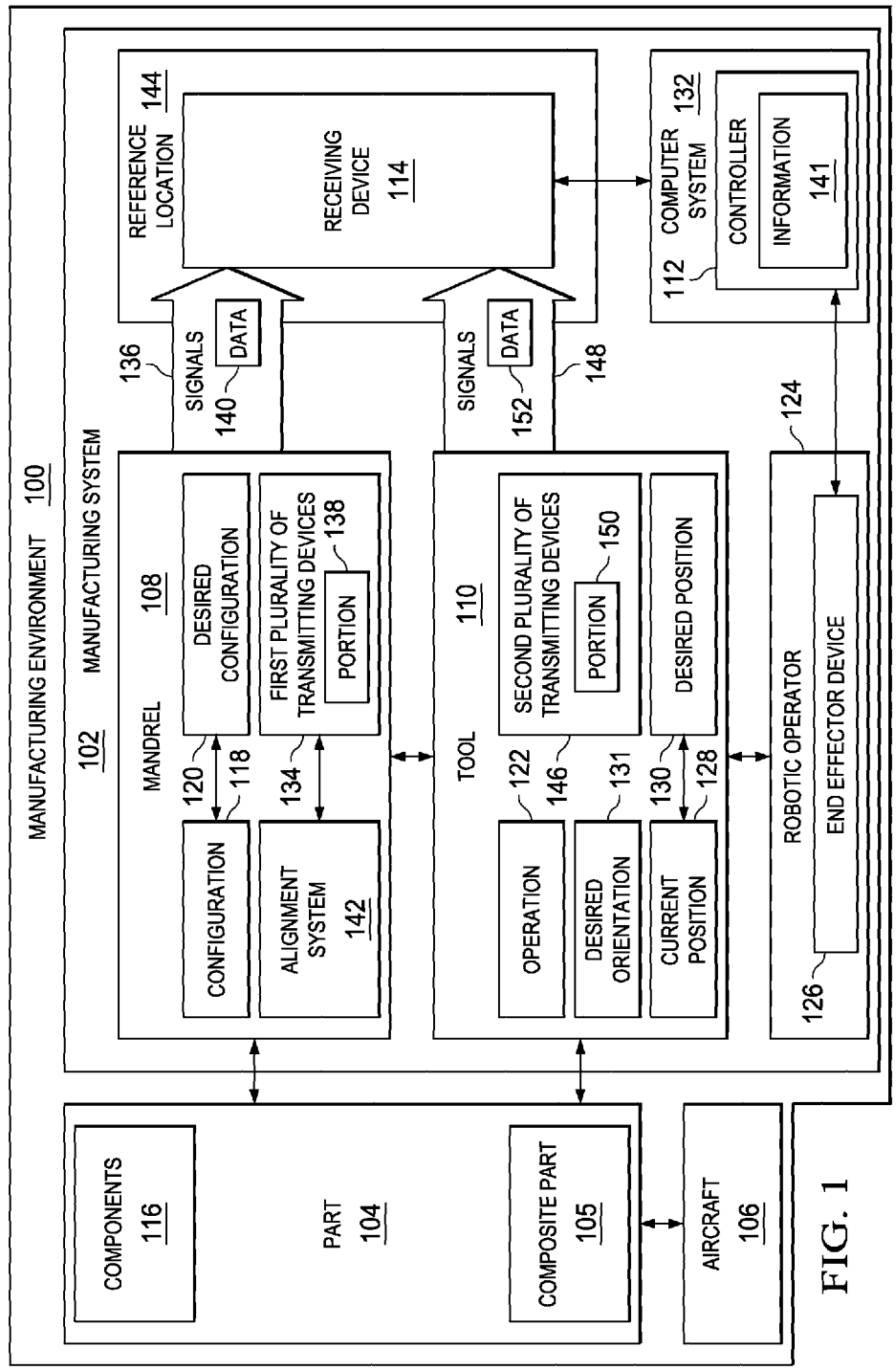
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment. In this depicted example, manufacturing environment 100 includes manufacturing system 102.

As depicted, manufacturing system 102 is used to manufacture part 104 for aircraft 106. In this illustrative example, part 104 takes a number of different forms. For example, part 104 may be selected from one of a skin panel, a flange, a bladder, a reservoir, a spar, a control surface, and other suitable types of part for aircraft 106.

In this depicted example, part 104 may be formed from various materials. For instance, part 104 may be formed from at least one of a metal, a metal alloy, a composite material, or some other suitable type of material.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, manufacturing system 102 includes mandrel 108, tool 110, controller 112, and receiving device 114. As depicted, mandrel 108 is a structure used to form part 104. In particular, mandrel 108 is used to shape part 104 in a desired manner.

For example, when part 104 is composite part 105, one or more layers of composite material are laid up on mandrel 108. The layers of composite material are then cured on mandrel 108 when exposed to a desired level of heat, pressure, or some combination thereof. Accordingly, composite part 105 is formed having a shape that corresponds to the contours of mandrel 108. If the shape of mandrel 108 changes, the shape of composite part 105 laid up on mandrel 108 also changes.

In another illustrative example, components 116 may be assembled to form part 104. For example, when forming part 104, components 116 may be fastened to one another. Mandrel 108 is used to shape part 104. In this illustrative example, part 104 is comprised of components 116. As depicted, mandrel 108 is configured to provide support for assembly of components 116 to form part 104.

In another illustrative example, components 116 are connected to one another using an adhesive to form part 104. In yet another illustrative example, components 116 are modified while on mandrel 108. For instance, components 116 are assembled and then holes are drilled into one or more of components 116 to form part 104 for installation in aircraft 106.

As illustrated, mandrel 108 comprises a number of different materials. As used herein, a "number of" items may be one or more items. In this illustrative example, a number of materials is one or more materials. In this depicted example, mandrel 108 comprises materials selected from at least one of a metal, a metal alloy, a composite material, or other suitable type of materials that provide the desired shape of part 104 for use in aircraft 106.

As depicted, mandrel 108 has configuration 118. Configuration 118 includes the physical characteristics of mandrel 108 in three-dimensional space. Configuration 118 comprises at least one of orientation, position, shape, and other suitable physical characteristics of mandrel 108. Configuration 118 is a current configuration for mandrel 108 at a point in time.

In this illustrative example, mandrel 108 also has desired configuration 120. Desired configuration 120 is a form of mandrel 108 that shapes part 104 in a desired manner. Desired configuration 120 is selected based on at least one of a shape, an orientation, a material, a size, a thickness, or some other desired characteristics for part 104.

As illustrated, to form part 104 for use in aircraft 106, it is desirable for configuration 118 of mandrel 108 to match desired configuration 120 within selected tolerances. When mandrel 108 has desired configuration 120, part 104 is formed to its specifications.

If configuration 118 of mandrel 108 does not match desired configuration 120 within selected tolerances, part 104 is not formed as desired, which may result in rework of part 104. In some cases, part 104 is discarded and a new part is formed. For instance, when mandrel 108 does not have desired configuration 120, layers of composite material for composite part 105 laid up on mandrel 108 may not have a desired configuration. As a result, composite part 105 may not be usable in assembling a fuselage of aircraft 106, may not pass certification, may cause aircraft 106 to have incorrect specifications, or a combination thereof.

In this depicted example, tool 110 is a device used to perform operation 122 on structures within manufacturing environment 100. For example, tool 110 is configured to perform operation 122 on at least one of mandrel 108, part 104, or some other structure within manufacturing environment 100.

In this illustrative example, tool 110 takes a number of different forms. For example, tool 110 may be selected from one of a composite layup device, a drill, a camera, an ultrasonic array, a fastener installer, a sealant applicator, a painting device, a mill, a marking device, a laser, a probe, a material applicator, a sensor or some other suitable tool.

Tool 110 is a single device in this example. In other illustrative examples, other tools in addition to tool 110 may be present in manufacturing system 102. In still other illustrative examples, tool 110 may have more than one device. For instance, tool 110 may include a fastener installer and a sealant applicator in one illustrative example.

As depicted, tool 110 moves relative to mandrel 108 to perform operation 122 on part 104. In this depicted example, operation 122 may be selected from one of a composite layup operation, a drilling operation, a fastener installation operation, a sealing operation, an inspection operation, a painting operation, a milling operation, a material application operation, a sensing operation, or some other suitable operation.

For example, when tool 110 is an ultrasonic array, tool 110 is used to inspect part 104 for inconsistencies. In another illustrative example, tool 110 may be a drill used to drill holes in part 104. In yet another illustrative example, tool 110 may include a sprayer configured to apply paint to part 104. In still another illustrative example, tool 110 is used to apply material to form part 104. For instance, layers of composite material may be applied by tool 110 to mandrel 108 to form composite part 105.

In this illustrative example, tool 110 is operated by robotic operator 124. Robotic operator 124 may take the form of, for example, without limitation, a robotic arm. In this depicted example, tool 110 is moved about mandrel 108 to perform operation 122 on part 104 using robotic operator 124. In particular, tool 110 may take the form of end effector device 126 configured for use with robotic operator 124.

As illustrated, tool 110 has current position 128 with respect to mandrel 108. In this illustrative example, current position 128 is the position of tool 110 with respect to mandrel 108 at the current time. For example, when operation 122 is a drilling operation and tool 110 has completed that drilling operation, tool 110 may have a current position that is retracted. Tool 110 will need to be moved to another location to drill another hole in part 104 on mandrel 108. In a similar fashion, when operation 122 is a composite layup operation, tool 110 may have a current position at one end of mandrel 108. Tool 110 will need to be moved to another location to layup another layer of composite material on mandrel 108.

Tool 110 also has desired position 130. Desired position 130 is a position with respect to mandrel 108 that is desired for tool 110 to perform operation 122. Desired position 130 is a location in three-dimensional space in this illustrative example.

For instance, desired position 130 may be a position where another hole is to be drilled in part 104. In another illustrative example, when operation 122 is a painting operation, desired position 130 for tool 110 is a position within a selected distance from the surface of part 104. In still another example, desired position 130 is a position for tool 110 to begin laying up additional composite material. Tool 110 moves from current position 128 to desired position 130 to perform operation 122.

In this illustrative example, tool 110 has desired orientation 131. Desired orientation 131 may be selected based on operation 122. For example, desired orientation 131 may be selected for tool 110 when performing a drilling operation. In another illustrative example, desired orientation 131 may be selected for a milling operation.

When tool 110 is operated by robotic operator 124, controller 112 is used. Controller 112 may be hardware in this illustrative example, but may include firmware or software in other illustrative examples.

When software is used, the operations performed by controller 112 may be implemented in program code configured to run on a processor unit. When firmware is used, the operations performed by controller 112 may be implemented in program code and data and stored in persistent memory to run on a processor unit. When hardware is employed, the hardware may include circuits that operate to perform the operations in controller 112.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Controller 112 is configured to move tool 110 operated by robotic operator 124 from current position 128 to desired position 130. In this illustrative example, controller 112 is implemented using computer system 132. Computer system 132 may comprise one or more computers. When more than one computer is present in computer system 132, those computers are in communication with each other over a communications medium such as a network.

In some illustrative examples, controller 112 in computer system 132 is physically associated with robotic operator 124. For example, a first component, such as a controller 112, may be considered to be physically associated with a second component, such as robotic operator 124, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second component, formed as an extension of the second component, or a combination thereof.

In other illustrative examples, computer system 132 with controller 112 is a remote unit. In this case, controller 112 communicates with robotic operator 124 through a wired or wireless communications medium.

In this depicted example, first plurality of transmitting devices 134 is physically associated with mandrel 108. First plurality of transmitting devices 134 is configured to provide information about the position of first plurality of transmitting devices 134. First plurality of transmitting devices 134 are electronic devices that generate signals 136.

First plurality of transmitting devices 134 may be active devices, passive devices, or a combination thereof. When first plurality of transmitting devices 134 are active, first plurality of transmitting devices 134 may generate signals 136 without receiving an excitation signal from another source. When first plurality of transmitting devices 134 are passive, first plurality of transmitting devices 134 do not transmit signals until activated. In other words, passive transmitting devices transmit signals after receiving an excitation signal from another source.

As illustrated, signals 136 take a number of different forms. For example, signals 136 may take the form of at least one of an electromagnetic signal, an optical signal, other suitable types of signals, or a combination thereof. As an example, first plurality of transmitting devices 134 transmit signals 136 in the form of radio waves. In another illustrative example, first plurality of transmitting devices 134 transmits signals 136 in the form of light. Signals 136 may be transmitted over a communications medium selected from at least one of wireless communications links, optical fiber cable, a wire, or other suitable types of communications links.

In this illustrative example, signals 136 are transmitted from portion 138 of first plurality of transmitting devices 134. Portion 138 is one or more of first plurality of transmitting devices 134. In other words, signals 136 may be transmitted from one transmitting device in first plurality of transmitting devices 134, more than one transmitting device in first plurality of transmitting devices 134, or all of first plurality of transmitting devices 134 at the same time.

In this depicted example, receiving device 114 is an electronic device that receives signals 136. In this illustrative example, receiving device 114 takes a number of different forms. For example, receiving device 114 may be selected from one of a radio receiver, a transceiver, an interferometer, a camera or other light capture device, and other suitable types of receiving devices.

As illustrated, receiving device 114 is in reference location 144. Reference location 144 is a position for receiving device 114 in manufacturing environment 100. Reference location 144 for receiving device 114 is used to determine the configuration of first plurality of transmitting devices 134 based on signals 136. Reference location 144 is also used to locate receiving device 114 with respect to tool 110 in this illustrative example.

Data 140 from signals 136 is processed by controller 112. For example, controller 112 processes data 140 to generate information 141 about mandrel 108. Information 141 takes various different forms. For instance, information 141 may be selected from at least one of a shape, an orientation, a position, or other suitable information about mandrel 108.

Controller 112 also may identify desired configuration 120 for mandrel 108. In this illustrative example, desired configuration 120 is identified using user input. Desired configuration 120 may be identified in another manner, depending on the particular implementation.

If controller 112 determines that desired configuration 120 and configuration 118 for mandrel 108 do not match within selected tolerances, mandrel 108 may be modified such that mandrel 108 has desired configuration 120. In some examples, this modification includes the rework of mandrel 108. In other illustrative examples, mandrel 108 is replaced. For instance, controller 112 may determine, based on at least one of the orientation, the position, or the shape of mandrel 108, that mandrel 108 should be replaced.

As depicted, first plurality of transmitting devices 134 is positioned on mandrel 108 in a number of different ways. For instance, first plurality of transmitting devices 134 may be placed along the surface of mandrel 108. In another illustrative example, at least one of first plurality of transmitting devices 134 are embedded within mandrel 108.

In this depicted example, alignment system 142 is also associated with mandrel 108. Alignment system 142 includes a number of mechanical structures configured to align part 104 with respect to mandrel 108. First plurality of transmitting devices 134 may be associated with alignment system 142 in some examples. For instance, each of first plurality of transmitting devices 134 may be attached to one of the mechanical structures within alignment system 142.

In this depicted example, second plurality of transmitting devices 146 is positioned with respect to tool 110. Second plurality of transmitting devices 146 may be attached to the outer surface of tool 110, within a housing for tool 110, or some combination thereof. Receiving device 114 receives signals 148 from portion 150 of second plurality of transmitting devices 146.

In this illustrative example, controller 112 processes data 152 from signals 148 to move tool 110. In one illustrative example, controller 112 is configured to determine current position 128 of tool 110 using signals 148 received from portion 150 of second plurality of transmitting devices 146 and signals 136 received from portion 138 of first plurality of transmitting devices 134.

After current position 128 of tool 110 is identified, controller 112 moves tool 110 from current position 128 to desired position 130 to perform operation 122 on part 104 associated with mandrel 108. For example, controller 112 may command robotic operator 124 to move tool 110 to desired position 130 based on signals 136 received from portion 138 of first plurality of transmitting devices 134.

With the use of first plurality of transmitting devices 134 and second plurality of transmitting devices 146, part 104 is less likely to need rework or be discarded. First plurality of transmitting devices 134 provide information 141 about mandrel 108 such that modifications may be made to mandrel 108 to manufacture part 104 in a desired manner. For instance, with information 141 about mandrel 108 from first plurality of transmitting devices 134, configuration 118 of mandrel 108 may be continuously monitored. Any deviations in configuration 118 of mandrel 108 may be detected before part 104 is manufactured in an undesired manner. As an example, when part 104 is composite part 105, configuration 118 of mandrel 108 may be continuously monitored such that composite part 105 laid up on mandrel 108 has a desired shape.

In one illustrative example, data 140 in signals 136 from first plurality of transmitting devices 134 may indicate that mandrel 108 needs to be replaced. Mandrel 108 can then be replaced before manufacturing another part. In another illustrative example, data 140 from first plurality of transmitting devices 134 indicates that a portion of mandrel 108 needs to be reworked. In this case, only that portion of mandrel 108 may need to be reworked and mandrel 108 may be salvageable.

With the use of second plurality of transmitting devices 146, tool 110 is allowed to be operated with a desired level of precision, resulting in more consistent and efficient performance of operation 122 on part 104. Data 152 in signals 148 from second plurality of transmitting devices 146 may indicate that tool 110 is not properly aligned with respect to part 104. For example, tool 110 used to drill holes in part 104 may be a half-inch lower than desired. Controller 112 then moves tool 110 to desired position 130 in this case.

In another illustrative example, tool 110 used to layup composite material may not have a desired orientation to layup the composite material in the correct direction. Controller 112 then moves tool 110 to desired orientation 131.

In this manner, manufacturing system 102 using first plurality of transmitting devices 134 and second plurality of transmitting devices 146 operates more efficiently than some currently used systems, while reducing the need for rework or discarding parts formed using components within manufacturing system 102. As a result, cost savings in manufacturing parts is realized.

Figure 2:
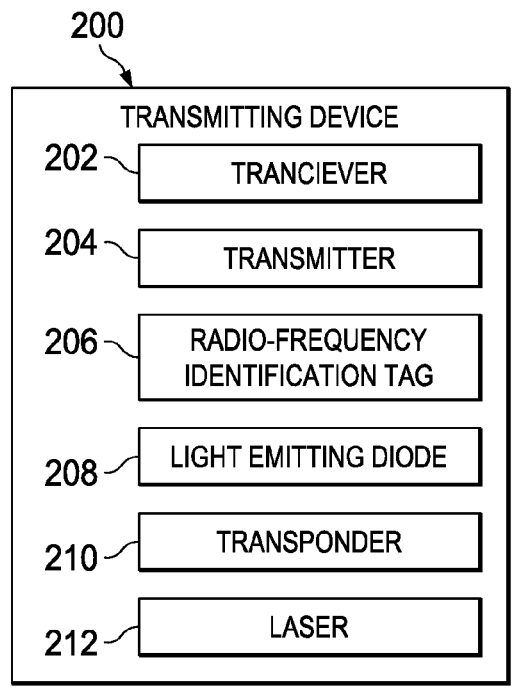
FIG. 2 is an illustration of a block diagram of a transmitting device in accordance with an illustrative embodiment.

With reference now to FIG. 2, an illustration of a block diagram of a transmitting device is depicted in accordance with an illustrative embodiment. Transmitting device 200 is an example of a transmitting device that may be used in first plurality of transmitting devices 134 in FIG. 1. Transmitting device 200 also may be used in second plurality of transmitting devices 146 in FIG. 1.

In this depicted example, transmitting device 200 may be selected from one of transceiver 202, transmitter 204, radio-frequency identification tag 206, light-emitting diode 208, and transponder 210. In other illustrative examples, other types of transmitting devices may be used for transmitting device 200, depending on the particular implementation.

As depicted, transceiver 202 is an electronic device that comprises both a transmitting device and a receiving device which are combined and share common circuitry in a single housing. When transmitting device 200 is transceiver 202, transmitting device 200 can communicate with other transmitting devices in first plurality of transmitting devices 134, second plurality of transmitting devices 146, or both which have transmitting and receiving capabilities. In other words, transceiver 202 is configured to communicate with other transceivers associated with mandrel 108, tool 110, or both, as shown in block form in FIG. 1. Transceiver 202 sends signals 136 in FIG. 1 to other transceivers in first plurality of transmitting devices 134, second plurality of transmitting devices 146, receiving device 114 in reference location 144, other receiving devices in manufacturing environment 100 shown in block form in FIG. 1, or a combination thereof.

In this illustrative example, transmitter 204 is an electronic device configured to send signals 136. When transmitting device 200 is transmitter 204, it is not configured to receive signals from other devices.

As illustrated, radio-frequency identification tag 206 is a device comprising electronically stored information. Radio-frequency identification tag 206 may be active, passive, or semi-passive. When radio-frequency identification tag 206 is an active or semi-passive transmitting device, radio-frequency identification tag 206 periodically transmits its identification signal. With an active or semi-passive tag, an integrated battery is included in radio-frequency identification tag 206. When radio-frequency identification tag 206 is passive, it may be activated by an external power source to generate a signal.

Signals from radio-frequency identification tag 206 can be sent even if radio-frequency identification tag 206 is covered by an object or is not visible. For example, radio-frequency identification tag 206 may be embedded in mandrel 108 and still provide signals 136.

As depicted, light-emitting diode 208 is a semiconductor light source. Light-emitting diode 208 is powered by a power source selected from one of a direct connection, a battery, a renewable power source and other suitable types of power. When the power source for light-emitting diode 208 is a renewable source, the power source may be selected from one of a solar cell, a heat-charged capacitor, a motion-charged capacitor, or some other suitable renewable source.

In this illustrative example, transponder 210 is an electronic device that emits a signal when an input signal is received from another device. In other words, transponder 210 may not send signals until it is activated, or interrogated, by another device. In some illustrative examples, transponder 210 may be physically associated with a receiving device. As depicted, laser 212 is a device configured to generate a beam of coherent light. Laser 212 may generate the beam at various points in the manufacturing process of a part.

The type of device selected for transmitting device 200 is based on various manufacturing factors. These factors include, for example, without limitation, cost, size, shape, availability, performance at high temperatures, signal strength, structural integrity, other suitable factors, or a combination thereof.

In this illustrative example, each of first plurality of transmitting devices 134 may be the same or a different type of transmitting device. For instance, one portion of first plurality of transmitting devices 134 may be light-emitting diodes, while another portion of first plurality of transmitting devices 134 are transceivers. In a similar fashion, transmitting devices selected for a portion of second plurality of transmitting devices 146 may be the same or different transmitting devices than those selected for first plurality of transmitting devices 134, for other portions of second plurality of transmitting devices 146, or a combination thereof.

As depicted, configuration 118 of mandrel 108, current position 128 of tool 110 in FIG. 1, or both may be updated in real-time, depending on the type of transmitting device selected. As the number of transmitting devices present in first plurality of transmitting devices 134 increases, the accuracy of the determination of configuration 118 of mandrel 108 also increases. In a similar fashion, as the number of transmitting devices present in second plurality of transmitting devices 146 increases, controller 112 controls tool 110 with an increased level of precision.

Figure 3:
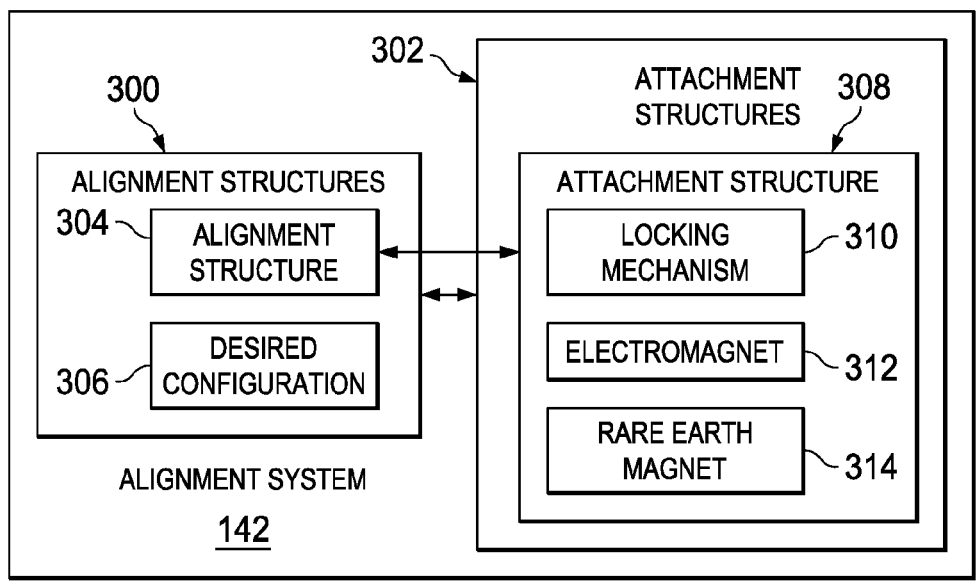
FIG. 3 is an illustration of a block diagram of an alignment system in accordance with an illustrative embodiment.

With reference next to FIG. 3, an illustration of a block diagram of an alignment system is depicted in accordance with an illustrative embodiment. In this depicted example, components within alignment system 142 are shown.

As depicted, alignment system 142 includes alignment structures 300 and attachment structures 302. In this illustrative example, alignment structures 300 are mechanical components positioned along a surface of mandrel 108 in FIG. 1. Alignment structures 300 may be referred to as "targets." In this illustrative example, alignment structures 300 are secured to mandrel 108 and used as reference points to position part 104 and tool 110 in FIG. 1 with respect to mandrel 108.

In this illustrative example, alignment structures 300 include alignment structure 304. Alignment structure 304 is formed from various types of materials. For example, alignment structure 304 is formed from metal, ferrous metal, metal alloy, plastic, composite material, and other suitable types of materials and combinations of materials.

As depicted, alignment structures 300 are configured to connect to mandrel 108 using attachment structures 302 such that alignment structures 300 maintain desired configuration 306. In this illustrative example, alignment structure 304 is physically associated with attachment structure 308 in attachment structures 302.

In this depicted example, desired configuration 306 comprises a position and orientation of each alignment structure with respect to mandrel 108. In other words, attachment structures 302 secure alignment structures 300 to mandrel 108 such that alignment structures 300 do not move relative to mandrel 108.

In this illustrative example, attachment structure 308 takes a number of different forms. For example, attachment structure 308 is selected from one of locking mechanism 310, electromagnet 312, and rare earth magnet 314. Attachment structure 308 may take other forms other than the ones shown, depending on the particular implementation.

When attachment structure 308 is locking mechanism 310, attachment structure 308 is installed within mandrel 108 such that alignment structure 304 can engage with attachment structure 308. In other words, each alignment structure is mechanically retained by an attachment structure.

When attachment structure 308 is electromagnet 312, a number of conductive wire coils may be embedded in mandrel 108. Each wire coil is connected to a power source and used to secure alignment structure 304. In this case, alignment structure 304 comprises a ferrous metal.

When attachment structure 308 is a rare earth magnet, rare earth magnet 314 is embedded within mandrel 108. Alignment structure 304 comprising ferrous metal is positioned on top of rare earth magnet 314 to secure alignment structure 304 to mandrel 108.

In this depicted example, each of the plurality of transmitting devices is physically associated with one of alignment structures 300. Accordingly, the transmitting device only moves as mandrel 108 changes configuration 118.

As configuration 118 of mandrel 108 changes, the configuration of at least one of alignment structures 300 changes. As a result, information about a change in configuration of alignment structures 300 yields information about the change in configuration 118 of mandrel 108. For example, if configuration 118 of mandrel 108 changes such that one of alignment structures 300 associated with a transmitting device moves, that transmitting device will send signals 136 to receiving device 114 in FIG. 1. Signals 136 may then be processed to determine the change in configuration 118 of that portion of mandrel 108.

The illustration of manufacturing environment 100 and the components within manufacturing system 102 shown in FIGS. 1-3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although the illustrative examples are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

Moreover, although tool 110 is described as being operated by robotic operator 124, a human operator also may operate tool 110 in some cases. For instance, a human operator may layup composite material on mandrel 108 for forming a composite part. In still another example, the human operator may drill holes in part 104 using tool 110. It is desirable for the human operator to determine whether part 104 is in the correct position and mandrel 108 has desired configuration 120 such that the human operator may perform operation 122 with tool 110 to form part 104 accurately for use in aircraft 106.

In other illustrative examples, a third plurality of transmitting devices may be positioned on part 104. In this case, the third plurality of transmitting devices sends signals to receiving device 114. From these signals, the configuration of part 104 is determined.

In still other illustrative examples, receiving device 114 is mounted on tool 110. For example, receiving device 114 may be mounted on end effector device 126 of robotic operator 124. In this case, receiving device 114 mounted on tool 110 receives signals 136 from first plurality of transmitting devices 134 such that controller 112 may position tool 110 with respect to mandrel 108. In this illustrative example, controller 112 may be physically associated with robotic operator 124 and receiving device 114.

In some cases, tool 110 may be a material applicator such as a three-dimensional printer. In this case, mandrel 108 may be absent and manufacturing environment 100 is a printing environment. In this illustrative example, the third plurality of transmitting devices may be placed on a portion of part 104 that has already been completed to orient tool 110 to print the remaining portion of part 104.

In still other illustrative examples, tool 110 is a sensor. For instance, tool 110 may be a temperature sensor configured to provide information about the temperature of part 104 at different stages of manufacturing for part 104. In other illustrative examples, tool 110 may include a plurality of devices. For instance, tool 110 may include a fastener installer, a sealant applicator, and a camera.

Figure 4:
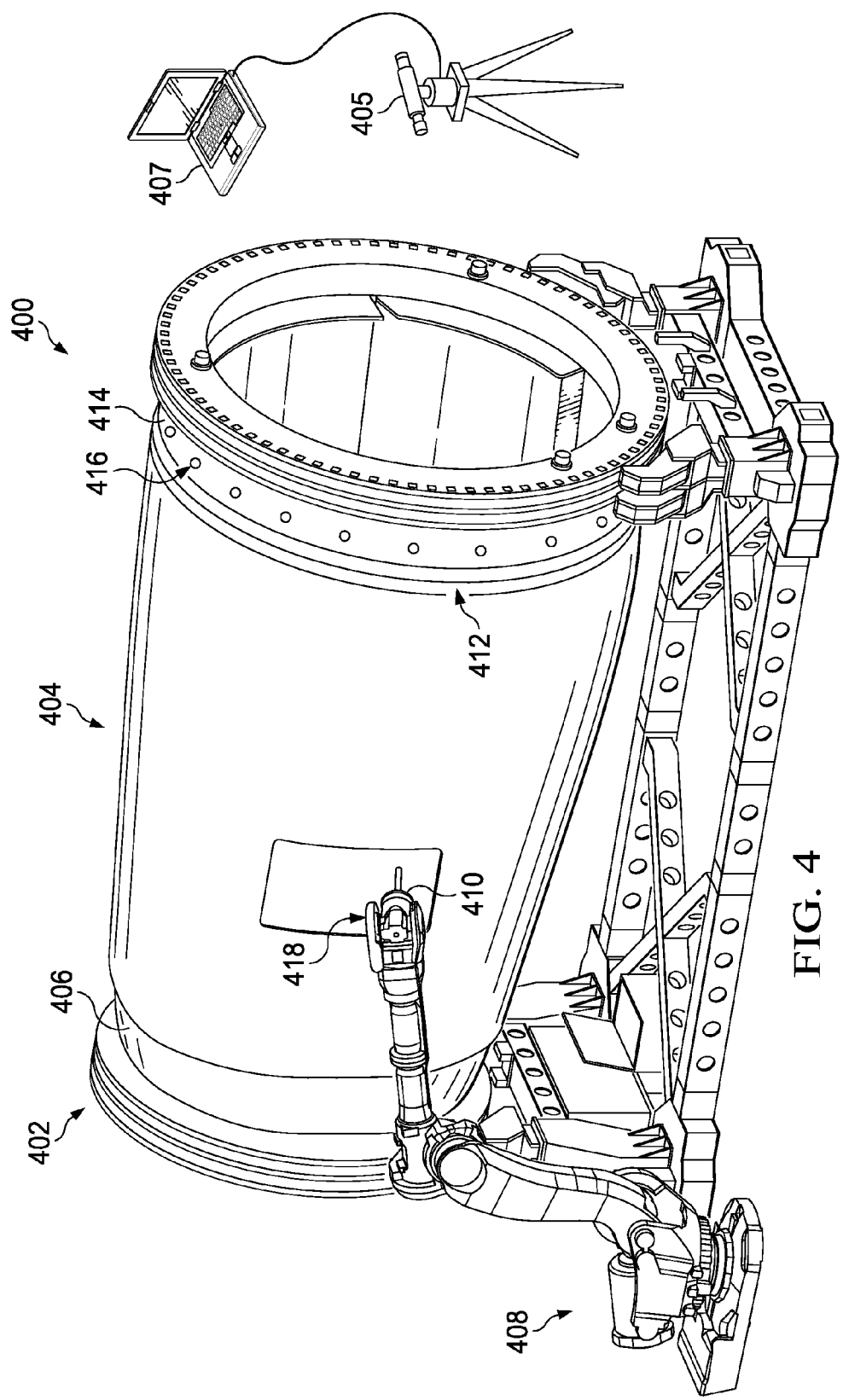
FIG. 4 is an illustration of a manufacturing environment in accordance with an illustrative embodiment.

Turning next to FIG. 4, an illustration of a manufacturing environment is depicted in accordance with an illustrative embodiment. In this depicted example, manufacturing environment 400 and the components within manufacturing environment 400 are examples of an implementation for components within manufacturing environment 100 shown in block form in FIG. 1.

In this illustrative example, manufacturing environment 400 includes manufacturing system 402, part 404, receiving device 405, and controller 407. Manufacturing system 402 includes mandrel 406 and robotic operator 408 in this illustrative example.

As depicted, robotic operator 408 is configured to operate drill 410 to drill holes in part 404. Controller 407 moves drill 410 to a desired position to drill holes in part 404.

In this depicted example, alignment structures 412 are arranged along outer surface 414 of mandrel 406. Alignment structures 412 are mechanical structures used to provide a mechanical reference system to position part 404 in this illustrative example. In this example, alignment structures 412 are not physically associated with transmitting devices. Rather, alignment structures 412 are installed in mandrel 406 at fixed locations. First plurality of transmitting devices 416 are installed in fixed locations different than the locations of alignment structures 412.

As illustrated, first plurality of transmitting devices 416 are positioned along outer surface 414 of mandrel 406. Receiving device 405 receives signals from first plurality of transmitting devices 416. In this illustrative example, controller 407 uses data from the signals to determine the configuration of mandrel 406. For example, as part 404 is being formed, controller 407 may identify that modifications need to be made to mandrel 406 before finishing part 404.

In this illustrative example, second plurality of transmitting devices 418 is positioned on drill 410. Second plurality of transmitting devices 418 communicates with receiving device 405 such that controller 407 can determine the position of drill 410 and move drill 410 to a desired position. In some cases, first plurality of transmitting devices 416 and second plurality of transmitting devices 418 are transceivers committed to communicate with one another.

For example, a portion of first plurality of transmitting devices 416 in the vicinity of a hole to be drilled communicates their positions to second plurality of transmitting devices 418. Controller 407 has knowledge of nominal positions of first plurality of transmitting devices 416 relative to the hole to be drilled. Controller 407 communicates to robotic operator 408 a desired position and a desired orientation for drill 410. As drill 410 moves to the approximate location of the hole to be drilled, the position and orientation of drill 410 may be refined based on the portion of first plurality of transmitting devices 416 until drill 410 reaches a final position to drill the hole.

In other illustrative examples, a third plurality of transmitting devices (not shown) may be positioned with respect to part 404. In this instance, the transmitting devices may be removably connected to part 404.

Figure 5:
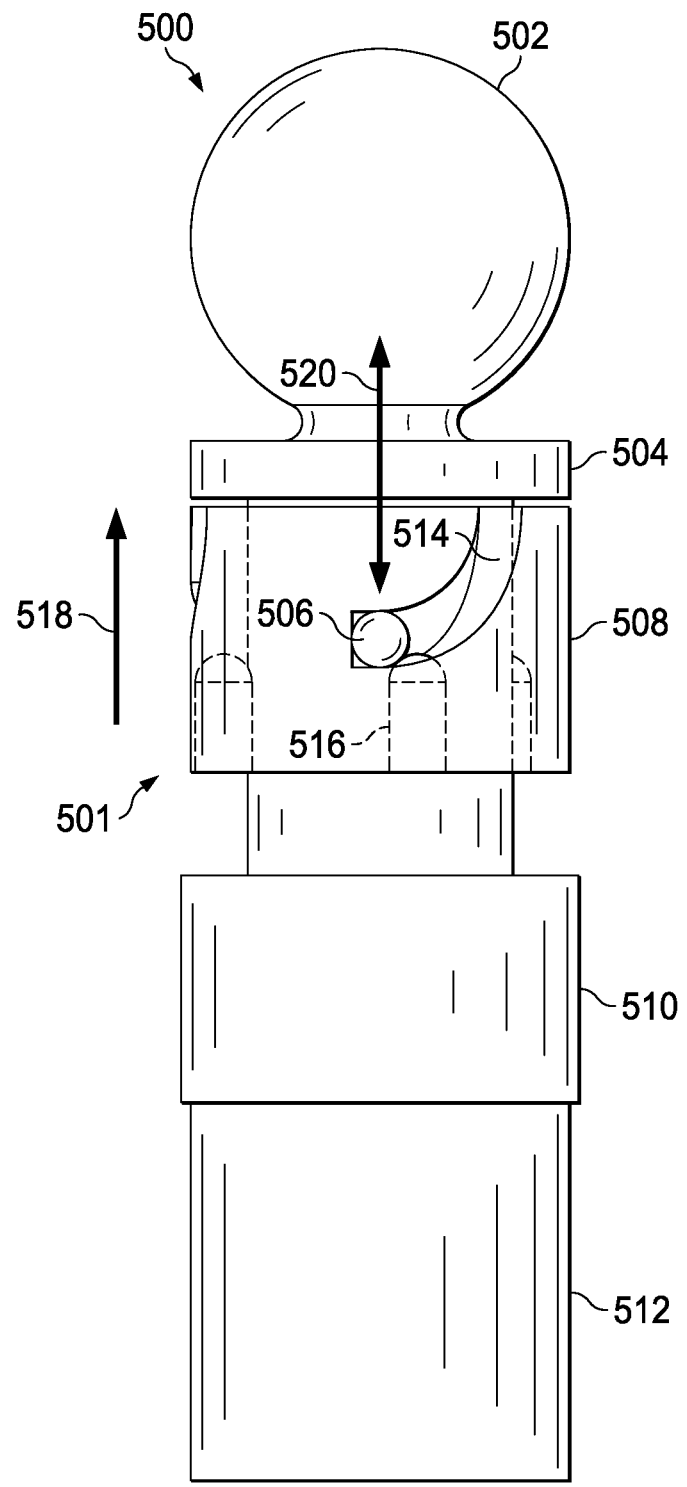
FIG. 5 is an illustration of a perspective view of an attachment structure and an alignment structure in accordance with an illustrative embodiment.

Turning next to FIG. 5, an illustration of a perspective view of an attachment structure and an alignment structure are depicted in accordance with an illustrative embodiment. In this depicted example, alignment structure 500 is an example of an alignment structure in alignment structures 412 from FIG. 4.

As depicted, alignment structure 500 is engaged with attachment structure 501. Alignment structure 500 and attachment structure 501 are examples of one implementation for alignment structure 304 and attachment structure 308, respectively, shown in block form in FIG. 3.

In this illustrative example, alignment structure 500 comprises tooling ball 502 and base 504 in this illustrative example. Tooling ball 502 is a sphere in this depicted example. In other illustrative examples, alignment structure 500 may take other forms. For instance, alignment structure 500 may have a shape selected from one of a cube, a cylinder, a prism, a disc, or some other suitable shape.

As illustrated, base 504 of alignment structure 500 has protrusions 506. Protrusions 506 extend from the sides of base 504 such that alignment structure 500 can lock into place in attachment structure 501. In this illustrative example, base 504 has two protrusions 506, but only one is shown in this view.

In this depicted example, attachment structure 501 comprises bushing 508, interface 510, and spring 512. In this depicted example, bushing 508 includes slots 514. Slots 514 in bushing 508 are configured to receive protrusions 506 of alignment structure 500. Retention springs 516 prevent protrusions 506 from moving backward and alignment structure 500 from falling out of attachment structure 501.

As illustrated, spring 512 provides consistent contact with bushing 508 in the direction of arrow 518. In this illustrative example, spring 512 is selected from one of a tension spring, a compression spring, a coil spring, a flat spring, or some other suitable type of spring. Retention springs 516 may be selected from similar types of springs, depending on the functionality involved. In some cases, spring 512 is positioned within a housing.

In this depicted example, interface 510 is configured to keep force from spring 512 applied along axis 520 of alignment structure 500. Interface 510 is attached to spring 512 to give base 504 a level platform on which to rest. Additionally, interface 510 protects the upper coils of spring 512 from an uneven load that may cause a kink and decrease the long-term effectiveness of spring 512. In some illustrative examples, interface 510 may be absent from attachment structure 501.

In this illustrative example, bushing 508, interface 510, and spring 512 are integrated into a mandrel. In other words, bushing 508, interface 510, and spring 512 are formed as part of the mandrel. In some illustrative examples, these components are embedded in the mandrel for easy installation of alignment structure 500.

As depicted, attachment structure 501 provides an efficient way to install alignment structure 500 in a mandrel. Bushing 508 with slots 514 allow alignment structure 500 to easily engage with attachment structure 501 and hold alignment structure 500 in place during manufacturing of a part.

Moreover, an operator may quickly install alignment structure 500 without the need for tape or other adhesives that can degrade in the manufacturing environment.

In some illustrative examples, a transmitting device is physically associated with alignment structure 500. In this case, the transmitting device may be placed inside tooling ball 502, attached to tooling ball 502, or associated with tooling ball 502 in some other suitable manner. Accordingly, both alignment structure 500 and the transmitting device may be installed more quickly and easily than some currently used systems. The secure attachment of alignment structure 500 with attachment structure 501 will enable an operator to identify outlying attachment structures relative to a fixed reference location or surrounding alignment structures with transmitting devices.

Figure 6:
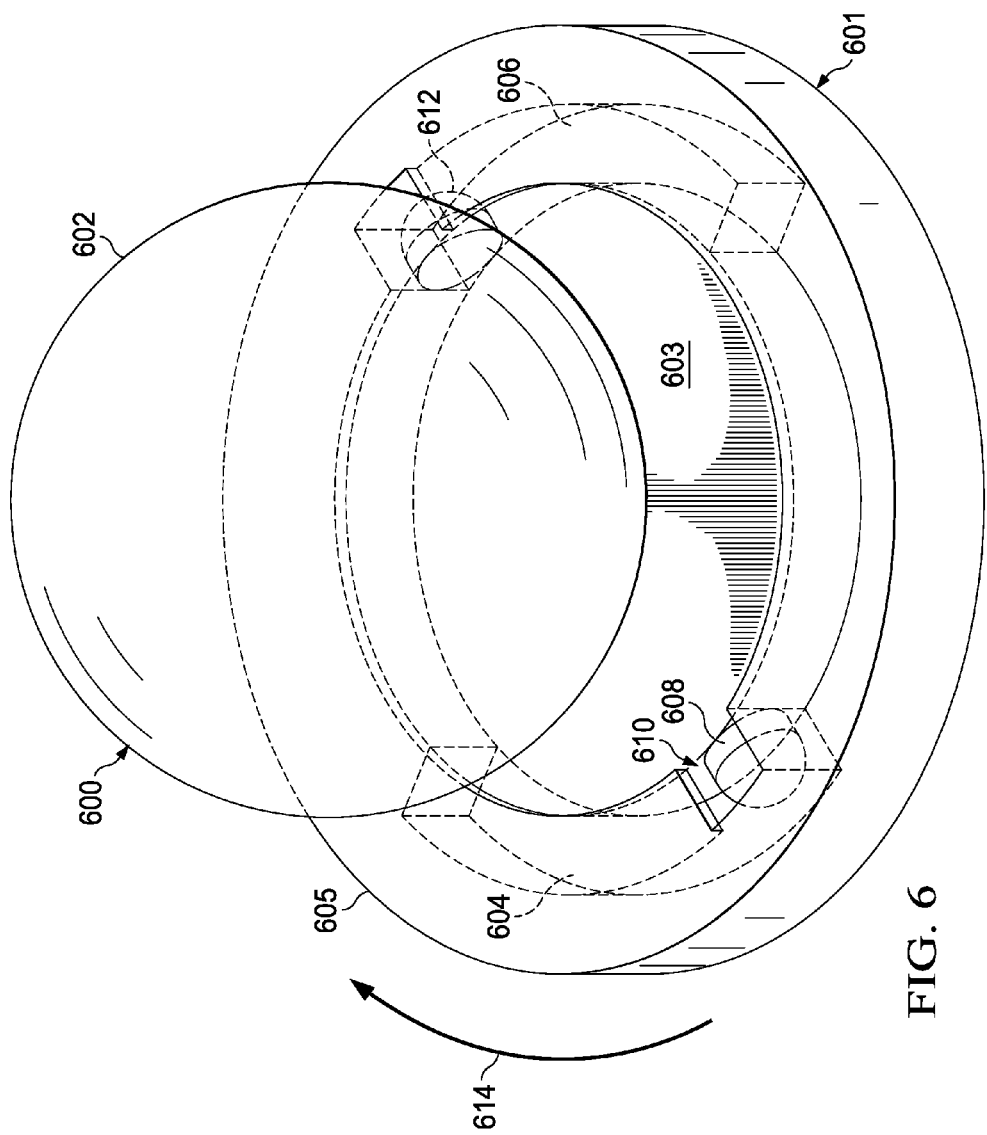
FIG. 6 is an illustration of a top view of an alignment structure and an attachment structure in accordance with an illustrative embodiment.

In FIG. 6, an illustration of a top view of an alignment structure and an attachment structure is depicted in accordance with an illustrative embodiment. In this depicted example, a top view of alignment structure 600 and attachment structure 601 is shown. Alignment structure 600 and attachment structure 601 are another example of one implementation for alignment structure 304 and attachment structure 308 shown in block form in FIG. 3.

As depicted, alignment structure 600 includes tooling ball 602 and base 603. Attachment structure 601 includes slot 604 and slot 606 on each side of bushing 605. Attachment structure 601 is formed as part of the mandrel in this illustrative example.

As illustrated, protrusion 608 of base 603 of alignment structure 600 is positioned within opening 610 of slot 604, while protrusion 612 is positioned within an opening (not shown) in slot 606. To install alignment structure 600, an operator moves alignment structure 600 in the direction of arrow 614 until retention springs or other mechanisms within bushing 605 are activated.

Figure 7:
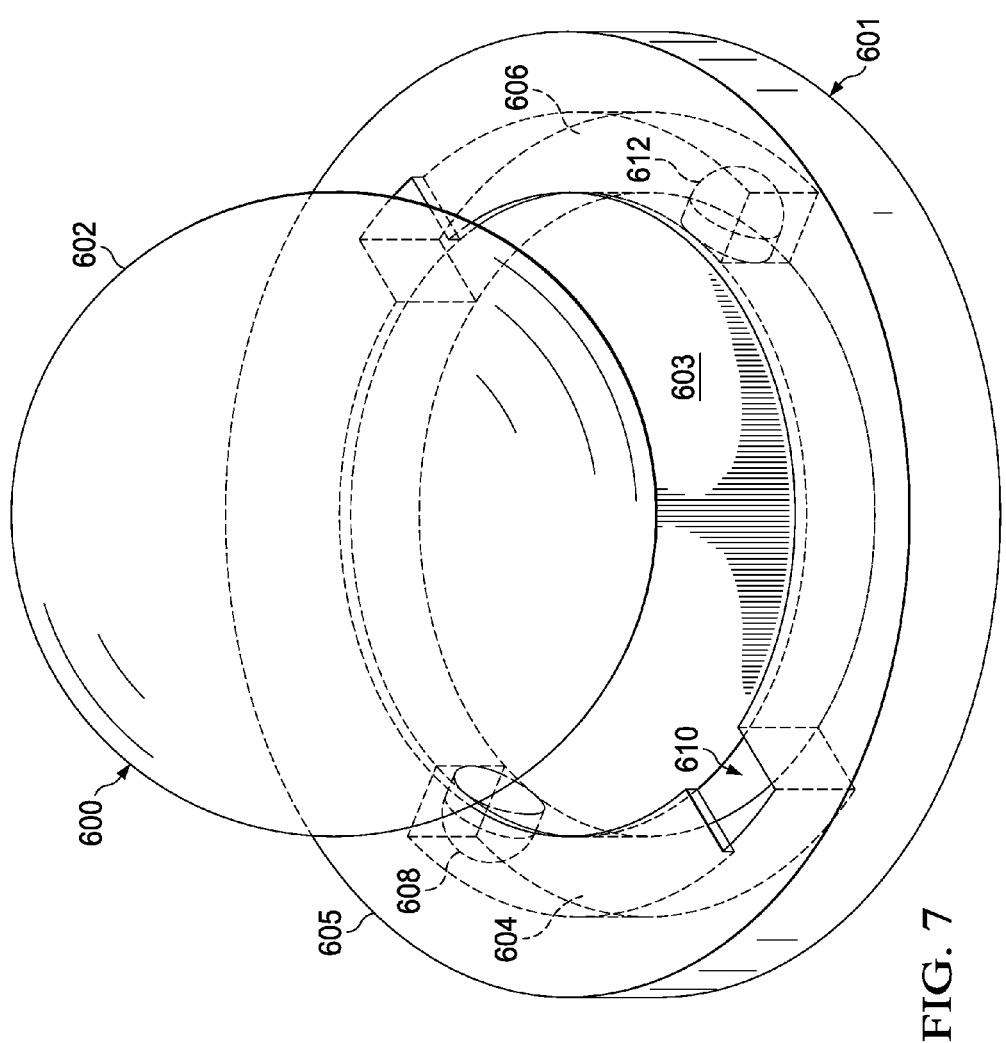
FIG. 7 is an illustration of a top view of an alignment structure and an attachment structure in accordance with an illustrative embodiment.

Turning next to FIG. 7, an illustration of a top view of an alignment structure and an attachment structure is depicted in accordance with an illustrative embodiment. In this depicted example, alignment structure 600 has been moved in the direction of arrow 614 in FIG. 6. Alignment structure 600 is now locked in place using attachment structure 601.

The illustrations of the alignment structures and attachment structures in FIGS. 5-7 are merely examples of how alignment structure 304 and attachment structure 308 from FIG. 3 may be implemented as physical structures. The illustrations of the alignment structures and attachment structures in FIGS. 5-7 are not meant to imply physical or architectural limitations to the manner in which an illustrative embodiment may be implemented. Other components in addition to or in place of the ones illustrated may be used. Some components may be optional.

For example, bushing 508 in FIG. 5 may have external threads in some illustrative examples. In another illustrative example, another retention device is used instead of retention springs 516 in FIG. 5. For example, magnets may be positioned on the innermost faces of slot 604 and slot 606 in FIG. 6.

In other illustrative examples, protrusions 506 may be spring loaded. In yet another illustrative example, a rare earth magnet, an electromagnet, or some other suitable retention device may be used in place of spring 512 and bushing 508, depending on the particular implementation.

Figure 8:
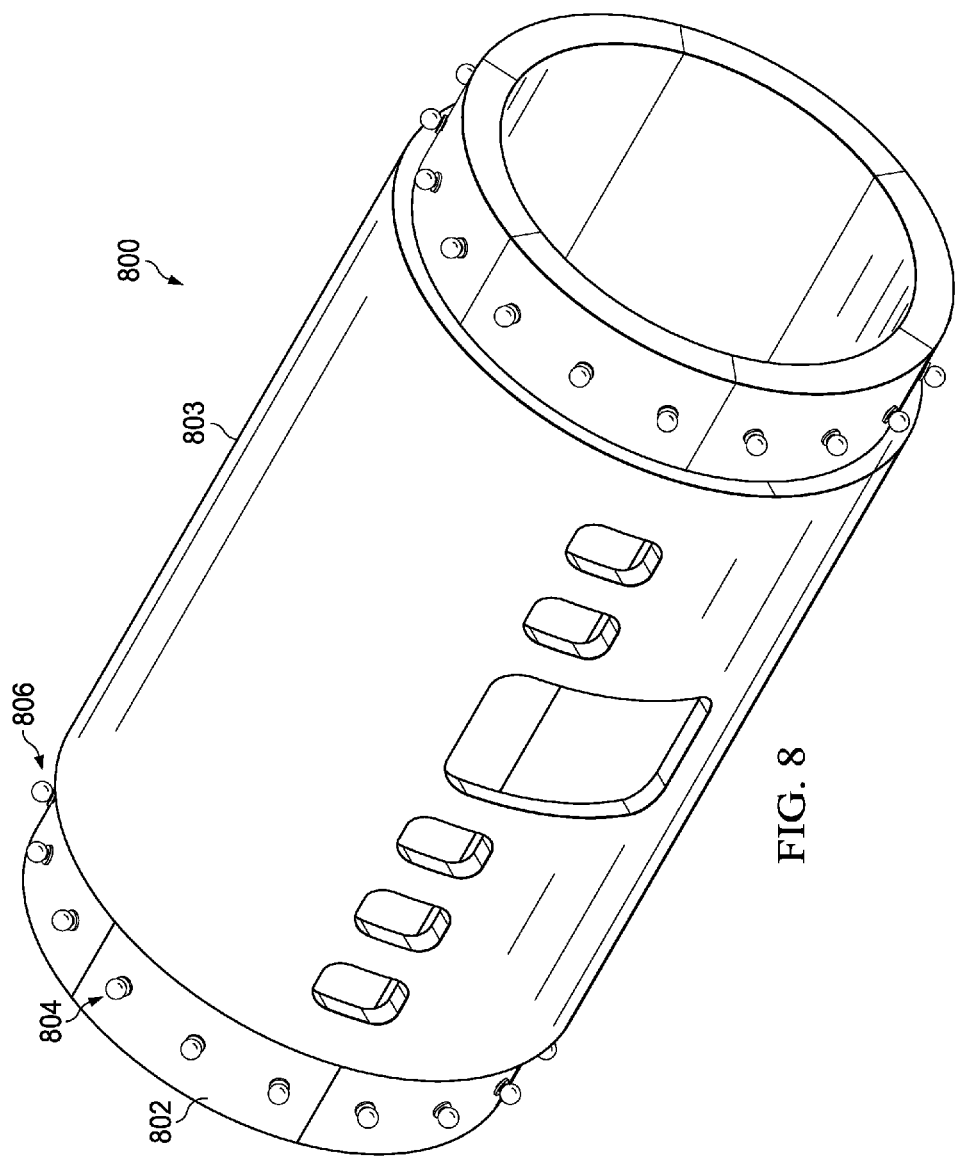
FIG. 8 is an illustration of a mandrel with a plurality of transmitting devices in accordance with an illustrative embodiment.

With reference now to FIG. 8, an illustration of a mandrel with a plurality of transmitting devices is depicted in accordance with an illustrative embodiment. In this depicted example, plurality of transmitting devices 800 are positioned with respect to mandrel 802. Part 803 is being manufactured on mandrel 802. For instance, part 803 may be a composite part laid up on mandrel 802.

As illustrated, plurality of transmitting devices 800 are transceivers 804. Transceivers 804 are physically associated with alignment structures 806. In other words, each of transceivers 804 are attached to alignment structures 806. Each of alignment structures 806 have been locked into place using an attachment structure (not shown) installed in mandrel 802.

While alignment structures 806 provide a visual reference system to align part 803 on mandrel 802, transceivers 804 send signals to a receiving device such that the configuration of each of alignment structures 806 is determined. Accordingly, information about at least one of the shape, orientation, and position of mandrel 802 can be generated.

In some illustrative examples, alignment structures 806 may be configured to identify themselves as misplaced. For instance, if the spacing between surrounding alignment structures 806 deviates from a nominal value, a signal may be generated indicating that rework, replacement, or another modification should be made to that particular alignment structure, mandrel 802, or both. In some cases, since alignment structures 806 are secured to mandrel 802, a change in any one of alignment structures 806 with a corresponding transceiver indicates a change in configuration of mandrel 802.

Figure 9:
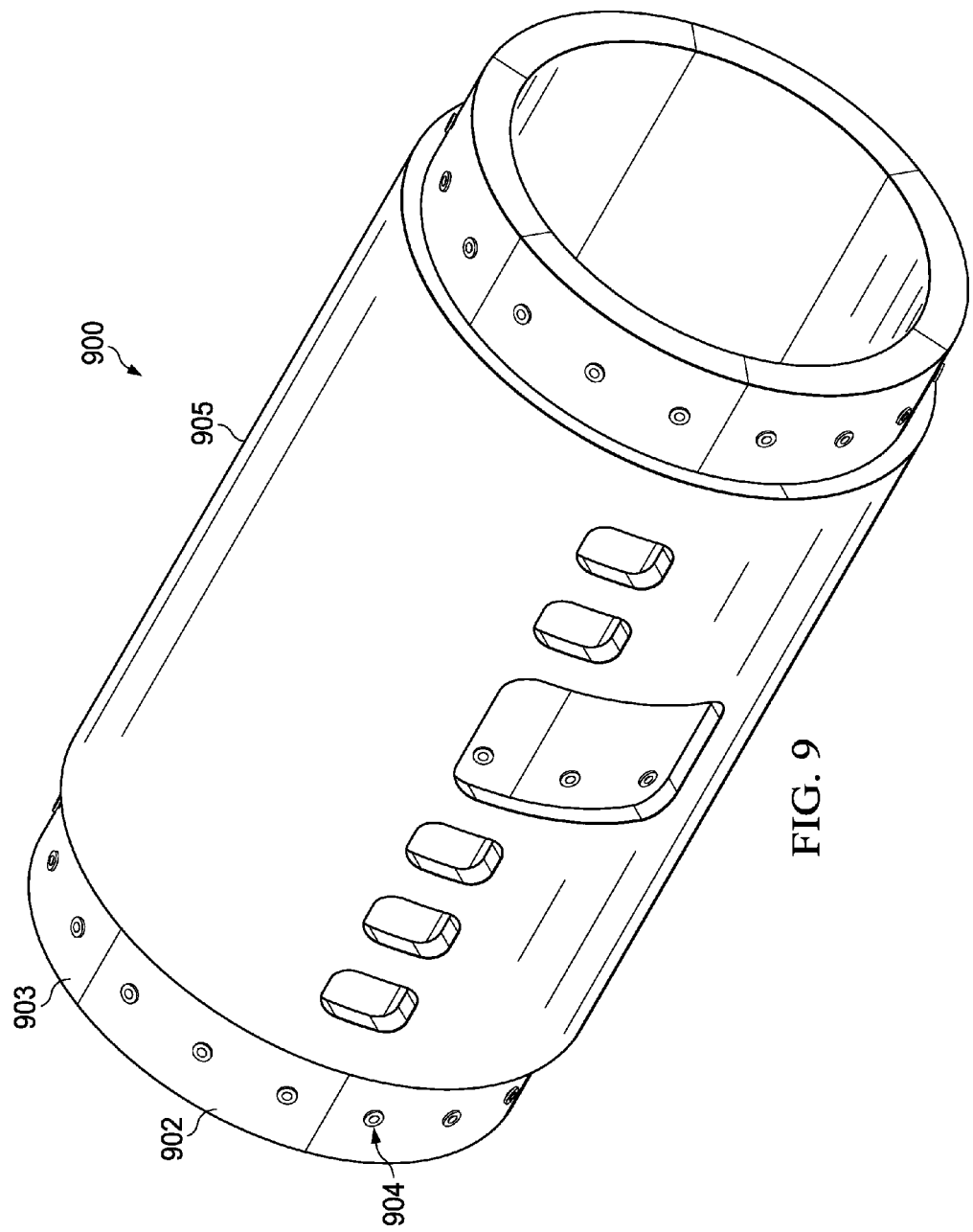
FIG. 9 is an illustration of a mandrel with a plurality of transmitting devices in accordance with an illustrative embodiment.

Turning now to FIG. 9, an illustration of a mandrel with a plurality of transmitting devices is depicted in accordance with an illustrative embodiment. In this depicted example, plurality of transmitting devices 900 is positioned with respect to mandrel 902. Part 905 is being manufactured on mandrel 902 in this illustrative example.

In this illustrative example, attachment structures are absent. Plurality of transmitting devices 900 is positioned along outer surface 903 of mandrel 902. Plurality of transmitting devices 900 are light-emitting diodes 904 in this illustrative example.

Light-emitting diodes 904 may be positioned such that light-emitting diodes 904 are flush, recessed, protruding, or some combination thereof with respect to outer surface 903 of mandrel 902. In this illustrative example, light-emitting diodes 904 are shown protruding from outer surface 903 of mandrel 902.

In this depicted example, optical sensors detect locations of light-emitting diodes 904 to identify the location of part 905 on mandrel 902, the configuration of mandrel 902, or both. The optical sensors are examples of receiving devices for light emitted by light-emitting diodes 904.

In other illustrative examples, light-emitting diodes 904 can be referenced to a fixed location away from part 905, each other, or a combination thereof. In this illustrative example, the position of part 905, the configuration of the mandrel, or both may be continuously updated while light-emitting diodes 904 are lit.

As illustrated, light-emitting diodes 904 provide a low-cost, energy-efficient light source that can be easily replaced. When light-emitting diodes 904 are recessed beneath outer surface 903 of mandrel 902, the position of light-emitting diodes 904 reduces the risk of the part colliding with one of light-emitting diodes 904, further reducing the risk for damage of light-emitting diodes 904.

In some examples, light-emitting diodes 904 are positioned using attachment structures such as those described in FIGS. 5-7. In other illustrative examples, light-emitting diodes 904 are removably connected to mandrel 902.

Figure 10:
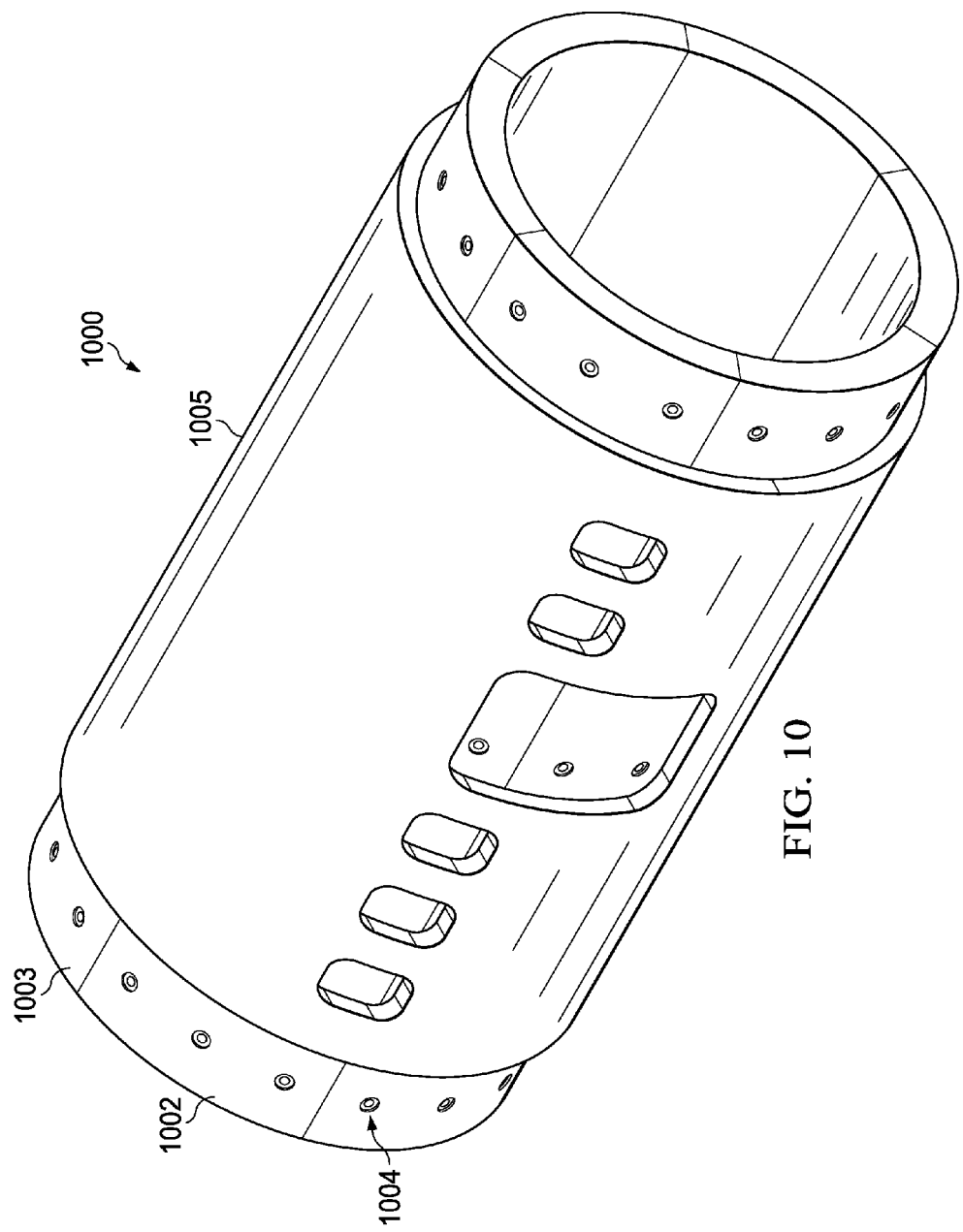
FIG. 10 is an illustration of a mandrel with a plurality of transmitting devices in accordance with an illustrative embodiment.

With reference next to FIG. 10, an illustration of a mandrel with a plurality of transmitting devices is depicted in accordance with an illustrative embodiment. In this depicted example, plurality of transmitting devices 1000 is positioned with respect to mandrel 1002. Part 1005 is being manufactured on mandrel 1002 in this illustrative example.

Plurality of transmitting devices 1000 comprise positioning system devices 1004. Positioning system devices 1004 are part of a positioning system in this illustrative example. This positioning system may be a global positioning system or a local positioning system. When the positioning system is a global positioning system, each of positioning system devices 1004 determines its position from signals sent by global positioning system satellites. When the positioning system is a local positioning system, each of positioning system devices 1004 determines its position from signals sent by signaling beacons in reference locations within the manufacturing environment.

In this depicted example, positioning system devices 1004 may transmit position information at regular intervals to a local receiver remote from mandrel 1002. The receiver receives the position information from each of positioning system devices 1004. The position information may then be processed to determine the configuration of mandrel 1002.

In this depicted example, positioning system devices 1004 may be positioned such that positioning system devices 1004 are flush, recessed, protruding, or some combination thereof with respect to outer surface 1003 of mandrel 1002. In this illustrative example, positioning system devices 1004 are shown recessed from outer surface 1003 of mandrel 1002.

Figure 11:
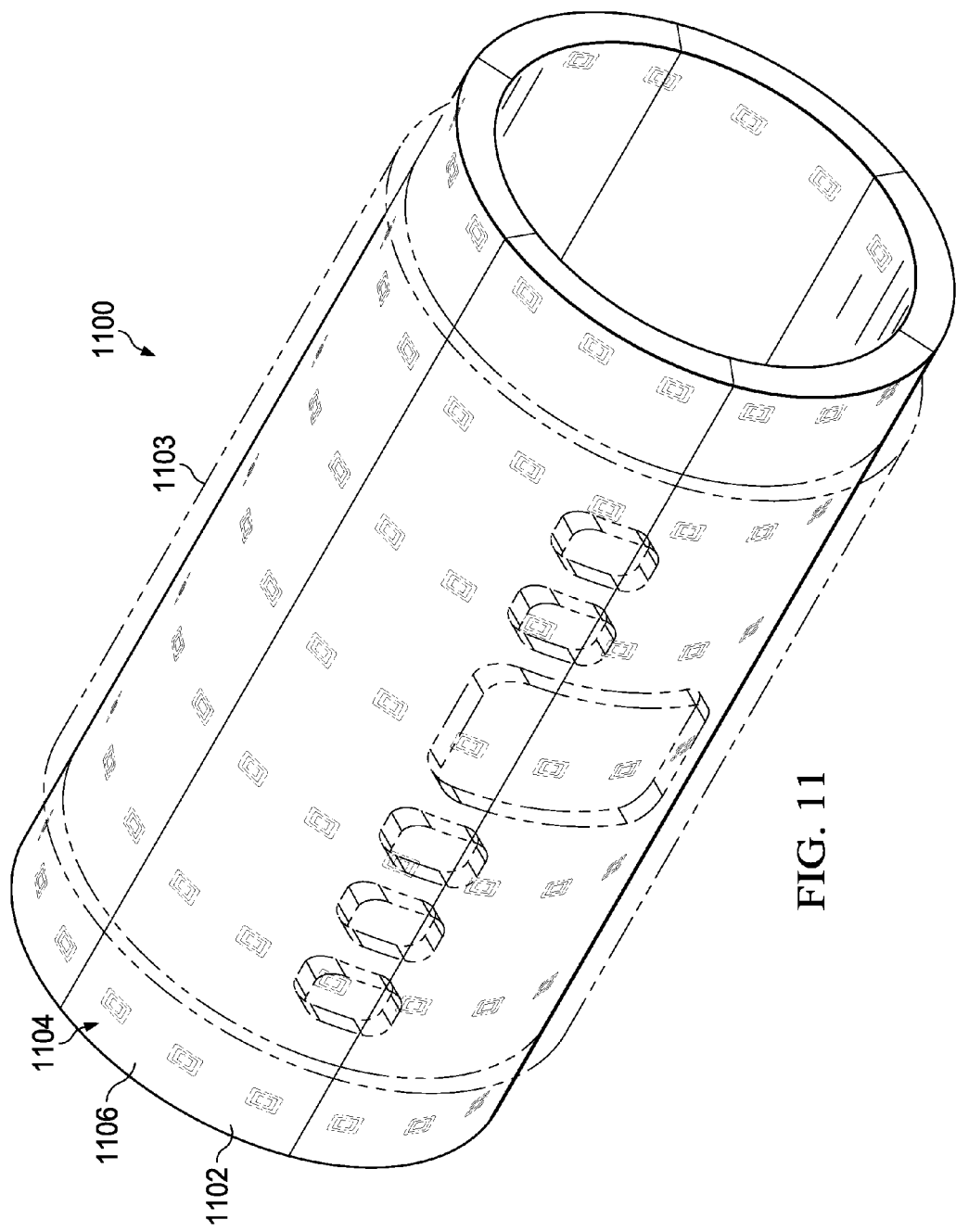
FIG. 11 is an illustration of a mandrel with a plurality of transmitting devices in accordance with an illustrative embodiment.

Referring next to FIG. 11, an illustration of a mandrel with a plurality of transmitting devices is depicted in accordance with an illustrative embodiment. In this depicted example, plurality of transmitting devices 1100 are positioned with respect to mandrel 1102. Part 1103 is being manufactured on mandrel 1102 in this illustrative example. Plurality of transmitting devices 1100 take the form of radio-frequency identification tags 1104 in this illustrative example.

Radio-frequency identification tags 1104 may be positioned along outer surface 1106 of mandrel 1102, embedded within mandrel 1102, or positioned with respect to mandrel 1102 in some other suitable manner. In a similar fashion to light-emitting diodes 904 in FIG. 9, radio-frequency identification tags 1104 may be referenced to fixed locations, to each other, or a combination thereof. The position of part 1103 on mandrel 1102, the configuration of mandrel 1102, or both may be updated continuously, depending on where radio-frequency identification tags 1104 are positioned.

In this illustrative example, radio-frequency identification tags 1104 are embedded within mandrel 1102 underneath outer surface 1106 of mandrel 1102. Mandrel 1102 and part 1103 are shown in phantom such that radio-frequency identification tags 1104 are visible in this illustrative example. Radio-frequency identification tags 1104 are passive in this illustrative example but may be active in other illustrative examples.

With radio-frequency identification tags 1104 embedded within mandrel 1102, the risk of collision with part 1103 on mandrel 1102 is reduced or eliminated, thus extending the life of radio-frequency identification tags 1104. Embedding radio-frequency identification tags 1104 may be desirable for forming a composite part where the entire surface of mandrel 1102 needs to be accessed. For example, layers of composite material may be laid up on mandrel 1102 and radio-frequency identification tags 1104 can still provide signals detectable by a receiving device. The receiving device is a radio-frequency identification tag reader in this illustrative example.

The illustrations of plurality of transmitting devices in FIGS. 8-11 are not meant to imply physical or architectural limitations to the manner in which an illustrative embodiment may be implemented. Other components in addition to or in place of the ones illustrated may be used. Some components may be optional. For example, the mandrels shown in FIGS. 8-11 are segmented mandrels. Six segments have been assembled to form each of the mandrels shown. In other illustrative examples, other numbers of segments may be assembled to form the mandrel or the mandrel may be one piece.

The different components shown in FIGS. 4-11 may be illustrative examples of how components shown in block form in FIGS. 1-3 can be implemented as physical structures. Additionally, some of the components in FIGS. 4-11 may be combined with components in FIGS. 1-3, used with components in FIGS. 1-3, or a combination of the two.

Figure 12:
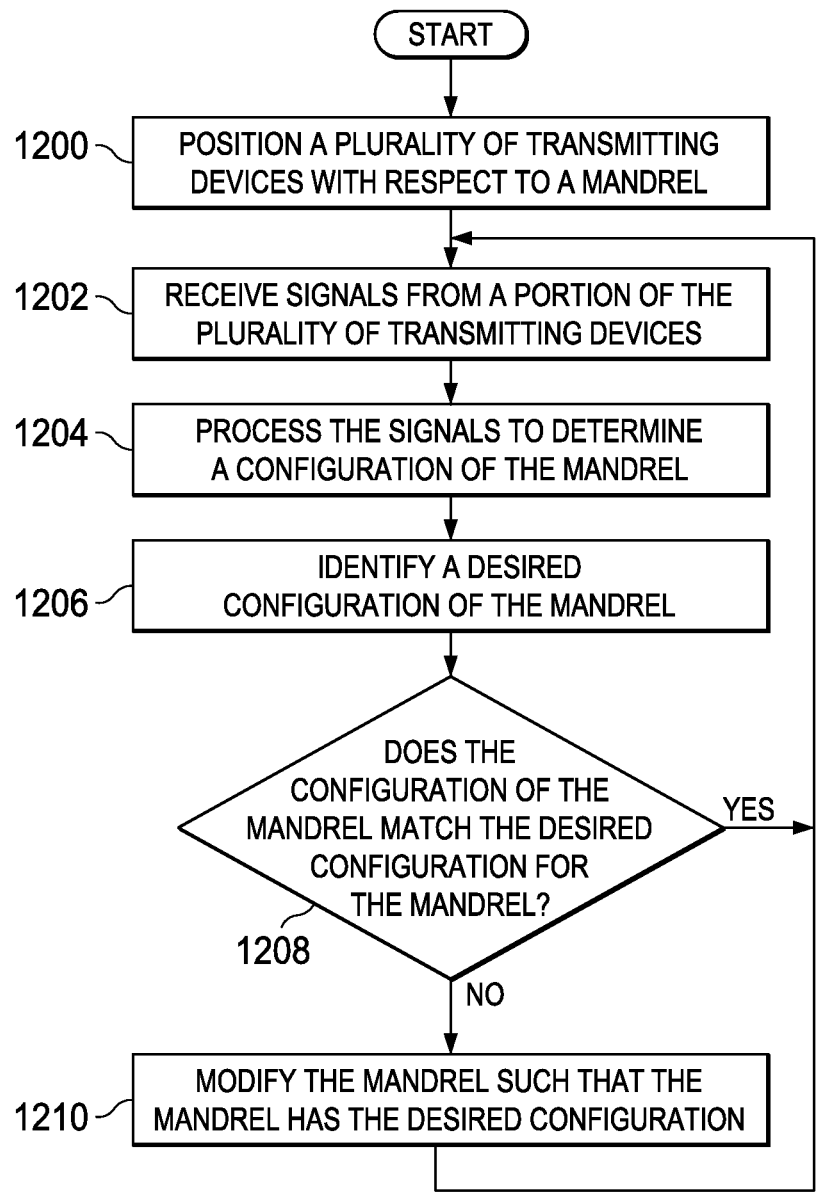
FIG. 12 is an illustration of a flowchart of a process for monitoring a configuration of a mandrel in accordance with an illustrative embodiment.

With reference now to FIG. 12, an illustration of a flowchart of a process for monitoring a configuration of a mandrel is depicted in accordance with an illustrative embodiment. In this depicted example, the process described in FIG. 12 may be an example of a process implemented in manufacturing environment 400 using first plurality of transmitting devices 416 in FIG. 4.

The process begins by positioning a plurality of transmitting devices with respect to a mandrel (operation 1200). For instance, transmitting devices are positioned along the outer surface of the mandrel.

The process then receives signals from a portion of the plurality of transmitting devices (operation 1202). The signals are received by a receiving device in this illustrative example.

Next, the signals are processed to determine the configuration of the mandrel (operation 1204). The configuration is a current configuration for the mandrel in this illustrative example. The configuration of the mandrel may change over time in an undesired manner. In operation 1204, a position, orientation, shape, or combination thereof of the mandrel is determined. For instance, the information from the plurality of transmitting devices may provide information about the contour of the surface of the mandrel.

The process then identifies a desired configuration of the mandrel (operation 1206). The desired configuration of the mandrel may be identified from a model, a database of parameters for the mandrel, user input, some other suitable source, or a combination thereof. Thereafter, a determination is made as to whether the configuration of the mandrel matches the desired configuration for the mandrel (operation 1208). In some cases, the configuration of the mandrel matches the desired configuration for the mandrel within selected tolerances.

If the configuration of the mandrel matches the desired configuration, the process returns to operation 1202 as described above. If the configuration of the mandrel does not match the desired configuration of the mandrel, the mandrel is modified such that the mandrel has the desired configuration (operation 1210) with the process returning to operation 1202 as described above. This modification includes rework and, in some cases, replacing the mandrel.

In this manner, the configuration of the mandrel is continuously monitored for deformation using the first plurality of transmitting devices and the receiving device. Accordingly, the process reduces inconsistencies in parts formed on the mandrel by ensuring that the mandrel maintains the desired configuration throughout the manufacturing process.

Figure 13:
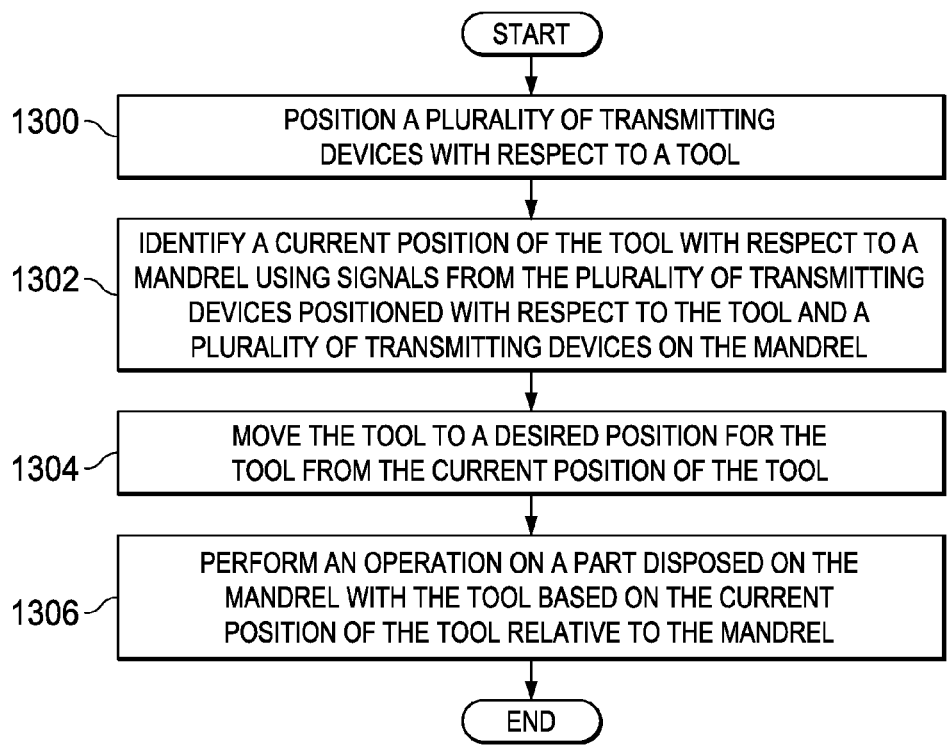
FIG. 13 is an illustration of a flowchart of a process for positioning a tool with respect to a mandrel in accordance with an illustrative embodiment.

Turning next to FIG. 13, an illustration of a flowchart of a process for positioning a tool with respect to a mandrel is depicted in accordance with an illustrative embodiment. As depicted, the process described in FIG. 13 may be an example of a process implemented in manufacturing environment 400 in using drill 410 and manufacturing system 402 to perform an operation on part 404 in FIG. 4.

The process begins by positioning a plurality of transmitting devices with respect to a tool (operation 1300). The transmitting devices are mounted on the tool in this illustrative example.

Next, the process identifies a current position of the tool with respect to a mandrel using signals from the plurality of transmitting devices positioned with respect to the tool and a plurality of transmitting devices on the mandrel (operation 1302). The signals are received by a receiving device in this illustrative example.

Thereafter, the tool is moved to a desired position for the tool from the current position of the tool (operation 1304). The process then performs an operation on a part disposed on the mandrel with the tool based on the current position of the tool relative to the mandrel (operation 1306) with the process terminating thereafter.

In some cases, the tool will perform a number of operations on the part. In one illustrative example, the tool drills holes in the part. In this case, the process described in FIG. 13 will repeat until the number of operations are performed by the tool in a desired manner. In other words, signals from the plurality of transmitting devices are processed to continuously update the position of the tool with respect to the mandrel and move the tool from its current position to a desired position.

Figure 14:
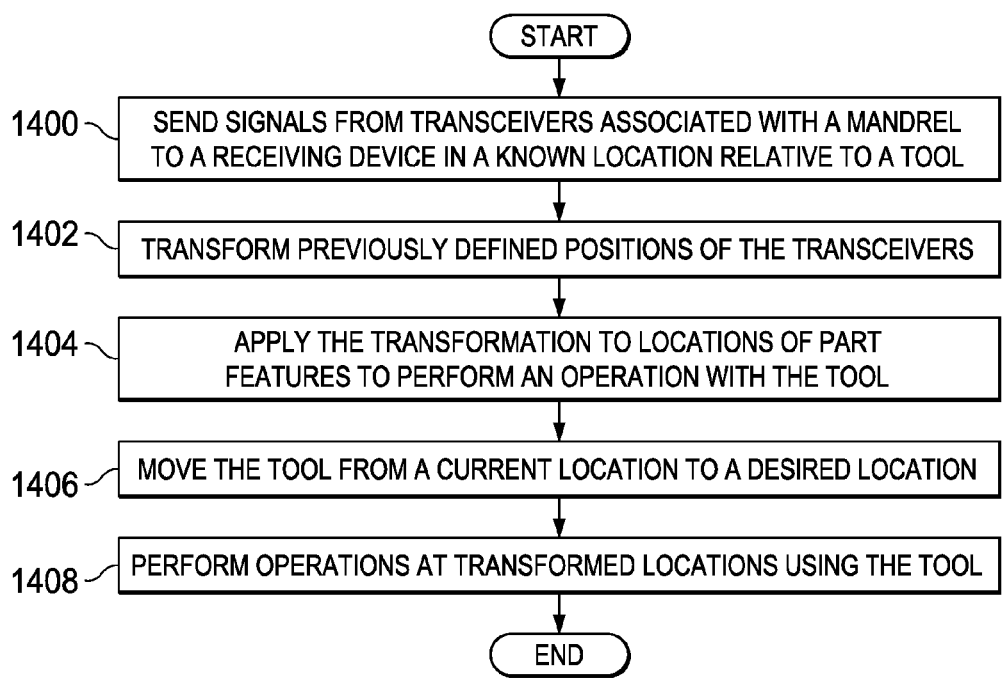
FIG. 14 is an illustration of a flowchart of a process for performing an operation on a part in accordance with an illustrative embodiment.

With reference to FIG. 14, an illustration of a flowchart of a process for performing an operation on a part is depicted in accordance with an illustrative embodiment. As depicted, the process described in FIG. 14 may be an example of a process implemented in manufacturing environment 400 in using drill 410 and manufacturing system 402 to perform an operation on part 404 in FIG. 4. In particular, the process described in FIG. 14 is used to perform an operation on a part in a manufacturing environment with fixed locations for the receiving device.

The process begins by sending signals from transceivers associated with a mandrel to a receiving device in a known location relative to a tool (operation 1400). The signals from the transceivers communicate the position of each transceiver to fixed receiving devices. In one illustrative example, the positions are communicated using a "machine coordinate system." A machine coordinate system is a reference system in which the tool operates. If the positions are not communicated in a reference coordinate system used by the tool, the positions are processed to match the reference coordinate system.

The process then transforms previously defined positions of the transceivers (operation 1402). The previous positions of the transceivers may be translated from a "part coordinate system." In this illustrative example, the airplane coordinate system is a reference system in which airplane parts are located in three-dimensional space.

Thereafter, the process applies the transformation to locations of part features to perform an operation with the tool (operation 1404). Next, the process moves the tool from a current location to a desired location (operation 1406). The process then performs operations at transformed locations using the tool (operation 1408) with the process terminating thereafter.

Figure 15:
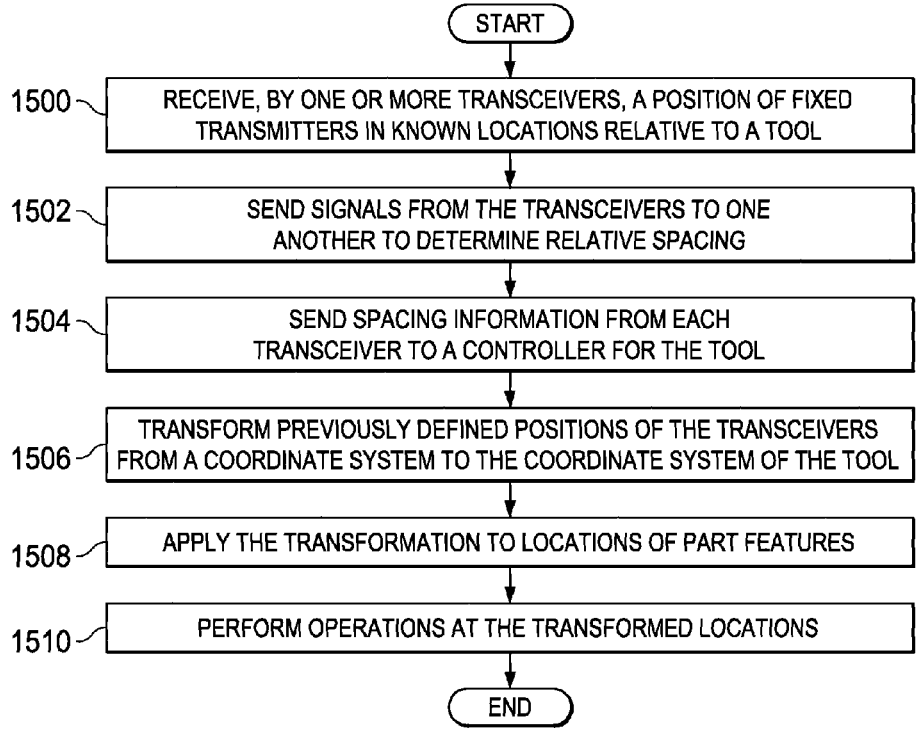
FIG. 15 is an illustration of a flowchart of a process for performing an operation on a part in accordance with an illustrative embodiment.

Turning next to FIG. 15, an illustration of a flowchart of a process for performing an operation on a part is depicted in accordance with an illustrative embodiment. As depicted, the process described in FIG. 15 may be an example of a process implemented in manufacturing environment 400 in using drill 410 and manufacturing system 402 to perform an operation on part 404 in FIG. 4. In particular, the process described in FIG. 15 is used to perform an operation on a part in a manufacturing environment with fixed transmitter locations.

The process begins by receiving, by one or more transceivers, the position of fixed transmitters in known locations relative to a tool (operation 1500). The positions may be received in a machine coordinate system by all transceivers.

Next, the process sends signals from the transceivers to one another to determine relative spacing (operation 1502). Spacing information from each transceiver is then sent to a controller for the tool (operation 1504). In some examples, the controller optimizes the information to match conditions for the tool.

Thereafter, the process transforms previously defined positions of the transceivers from a coordinate system to the coordinate system of tool (operation 1506). For instance, the positions may be transformed from an airplane coordinate system to a machine coordinate system. The process then applies the transformation to locations of part features (operation 1508). Next, the tool performs operations at the transformed locations (operation 1510) with the process terminating thereafter.

Figure 16:
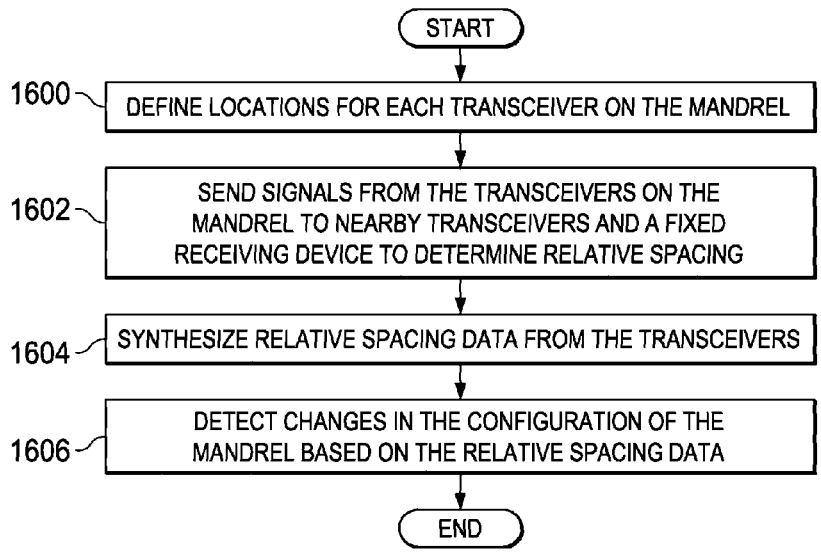
FIG. 16 is an illustration of a flowchart of a process for monitoring a configuration of a mandrel in accordance with an illustrative embodiment.

In FIG. 16, an illustration of a flowchart of a process for monitoring a configuration of a mandrel is depicted in accordance with an illustrative embodiment. In this depicted example, the process described in FIG. 16 may be an example of a process implemented in manufacturing environment 400 using first plurality of transmitting devices 416 in FIG. 4.

The process begins by defining locations for each transceiver on the mandrel (operation 1600). The locations for each transceiver may be defined through a calibration process prior to the use of the mandrel to manufacture a part.

Next, signals are sent from the transceivers on the mandrel to nearby transceivers and a fixed receiving device to determine relative spacing (operation 1602). The fixed receiving device may be associated with a controller.

Thereafter, the process synthesizes relative spacing data from the transceivers (operation 1604). In this illustrative example, the controller synthesizes the spacing data and fits a point cloud to locations defined through calibration.

The process then detects changes in the configuration of the mandrel based on the relative spacing data (operation 1606) with the process terminating thereafter. For instance, when the mandrel is comprised of segments joined together, changes in shape are detected within mandrel segments and between mandrel segments. In this manner, the transceivers can detect if the mandrel segments were not joined correctly, are deforming with use, or a combination thereof. In other illustrative examples, the process detects other types of inconsistencies with respect to the mandrel.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 17:
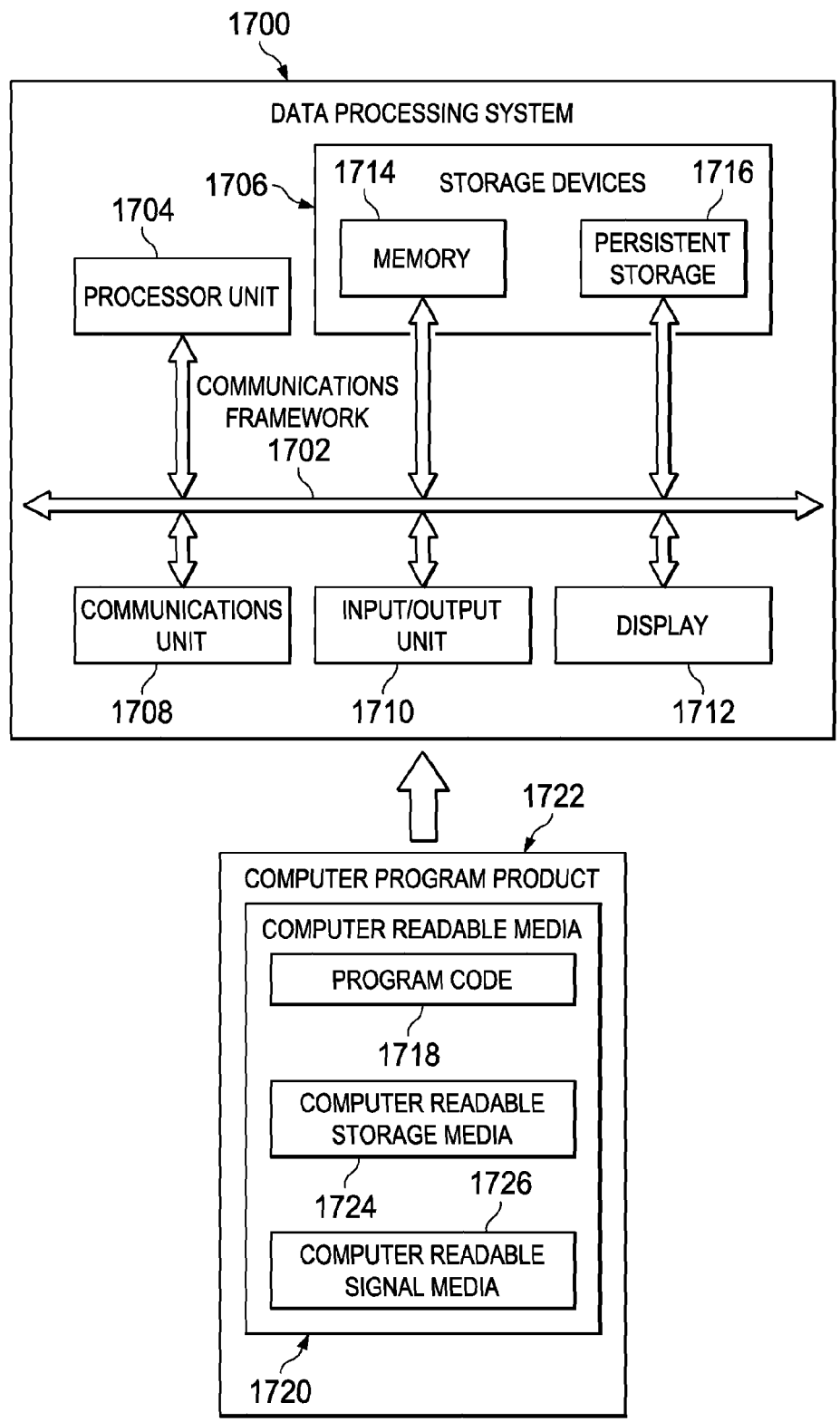
FIG. 17 is an illustration of a data processing system in the form of a block diagram in accordance with an illustrative embodiment.

Turning now to FIG. 17, an illustration of a data processing system in the form of a block diagram is depicted in accordance with an illustrative embodiment. Data processing system 1700 may be used to implement one or more computers in computer system 132 in FIG. 1. As depicted, data processing system 1700 includes communications framework 1702, which provides communications between processor unit 1704, storage devices 1706, communications unit 1708, input/output unit 1710, and display 1712. In some cases, communications framework 1702 may be implemented as a bus system.

Processor unit 1704 is configured to execute instructions for software to perform a number of operations. Processor unit 1704 may comprise a number of processors, a multi-processor core, some other type of processor, or some combination thereof, depending on the implementation. In some cases, processor unit 1704 may take the form of a hardware unit, such as a circuit system, an application specific integrated circuit (ASIC), a programmable logic device, or some other suitable type of hardware unit.

Instructions for the operating system, applications, programs, or both run by processor unit 1704 may be located in storage devices 1706. Storage devices 1706 may be in communication with processor unit 1704 through communications framework 1702. As used herein, a storage device, also referred to as a computer readable storage device, is any piece of hardware capable of storing information on a temporary basis, permanent basis, or both. This information may include, but is not limited to, at least one of data, program code, or other information.

Memory 1714 and persistent storage 1716 are examples of storage devices 1706. Memory 1714 may take the form of, for example, a random access memory or some type of volatile or non-volatile storage device. Persistent storage 1716 may comprise any number of components or devices. For example, persistent storage 1716 may comprise a hard drive, a flash memory, a rewritable optical disk, a rewritable magnetic tape, or some combination of the above. The media used by persistent storage 1716 may or may not be removable.

Communications unit 1708 allows data processing system 1700 to communicate with other data processing systems, devices, or some combination thereof. Communications unit 1708 may provide communications using physical and/or wireless communications links.

Input/output unit 1710 allows input to be received from and output to be sent to other devices connected to data processing system 1700. For example, input/output unit 1710 may allow user input to be received through at least one of a keyboard, a mouse, or some other type of input device. As another example, input/output unit 1710 may allow output to be sent to a printer connected to data processing system 1700.

Display 1712 is configured to display information to a user. Display 1712 may comprise, for example, without limitation, selected from one of a monitor, a touch screen, a laser display, a holographic display, a virtual display device, or some other type of display device.

In this illustrative example, the processes of the different illustrative embodiments may be performed by processor unit 1704 using computer-implemented instructions. These instructions may be referred to as program code, computer usable program code, or computer readable program code and may be read and executed by one or more processors in processor unit 1704.

In these examples, program code 1718 is located in a functional form on computer readable media 1720, which is selectively removable, and may be loaded onto or transferred to data processing system 1700 for execution by processor unit 1704. Program code 1718 and computer readable media 1720 together form computer program product 1722. In this illustrative example, computer readable media 1720 may be computer readable storage media 1724 or computer readable signal media 1726.

Computer readable storage media 1724 is a physical or tangible storage device used to store program code 1718 rather than a medium that propagates or transmits program code 1718. Computer readable storage media 1724 may be, for example, without limitation, an optical or magnetic disk or a persistent storage device that is connected to data processing system 1700.

Alternatively, program code 1718 may be transferred to data processing system 1700 using computer readable signal media 1726. Computer readable signal media 1726 may be, for example, a propagated data signal containing program code 1718. This data signal may be an electromagnetic signal, an optical signal, or some other type of signal that can be transmitted over physical, wireless communications links, or some combination thereof.

The illustration of data processing system 1700 in FIG. 17 is not meant to provide architectural limitations to the manner in which the illustrative embodiments may be implemented. The different illustrative embodiments may be implemented in a data processing system that includes components in addition to or in place of those illustrated for data processing system 1700. Further, components shown in FIG. 17 may be varied from the illustrative examples shown.

Figure 18:
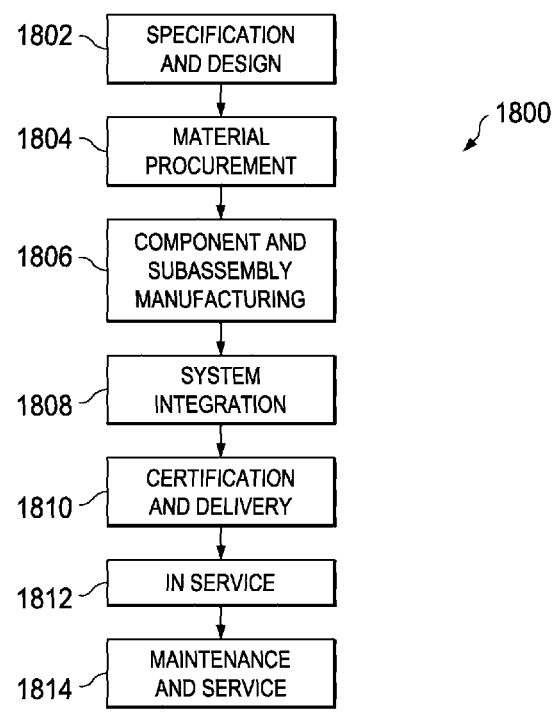
FIG. 18 is an illustration of an aircraft manufacturing and service method in the form of a block diagram in accordance with an illustrative embodiment.
Figure 19:
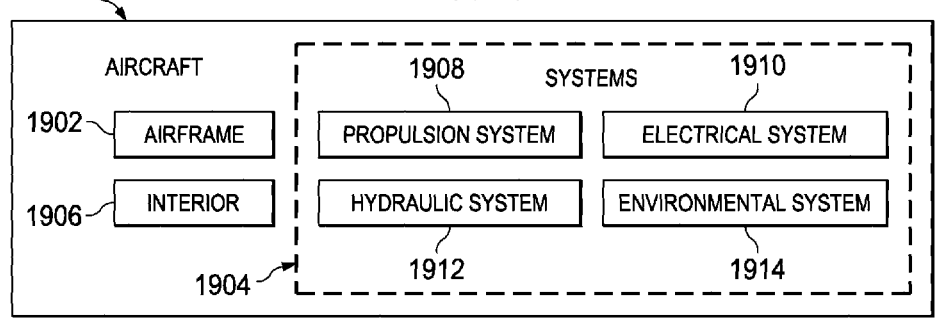
FIG. 19 is an illustration of an aircraft in the form of a block diagram in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. In particular, manufacturing system 102 with first plurality of transmitting devices 134 and second plurality of transmitting devices 146 from FIG. 1 may be used during any one of the stages of aircraft manufacturing and service method 1800. For example, without limitation, manufacturing system 102 with first plurality of transmitting devices 134 and second plurality of transmitting devices 146 from FIG. 1 may be used to monitor configuration 118 of mandrel 108, the position of part 104, or both during component and subassembly manufacturing 1806. In some cases, second plurality of transmitting devices 146 also may be used during system integration 1808, routine maintenance and service 1814, or some other stage of aircraft manufacturing and service method 1800.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18. One or more apparatus embodiments, method embodiments, or a combination thereof may be utilized while aircraft 1900 is in service 1812, during maintenance and service 1814, or both in FIG. 18. The use of a number of the different illustrative embodiments may substantially expedite the assembly of aircraft 1900, reduce the cost of aircraft 1900, or both.

Thus, the illustrative embodiments provide a method and system for monitoring configuration 118 of mandrel 108. First plurality of transmitting devices 134 is positioned with respect to mandrel 108. Signals 136 from portion 150 of first plurality of transmitting devices 134 are received at receiving device 114. Signals 136 are processed to determine configuration 118 of mandrel 108.

With the use of an illustrative embodiment, the configuration of a mandrel is more easily monitored than with currently used systems. The shape, position, and orientation of the mandrel may be determined in real-time. As a result, modifications can be made to the mandrel such that parts formed on the mandrel are formed in a desired manner. For instance, the configuration of the mandrel may be monitored such that layers of composite material may be laid up on the mandrel and cured to form the desired shape, thickness, or both shape and thickness of the composite part. When the configuration of the mandrel is monitored, undesired inconsistencies in the composite part due to a deformed or misaligned mandrel may be reduced or eliminated.

The illustrative embodiments also provide an efficient process for positioning a tool with respect to a mandrel. With the use of transceivers positioned on the mandrel and the tool, the tool can be controlled to perform operations on the part with greater precision. In this manner, the illustrative embodiments reduce the risk that the part formed on the mandrel needs to be reworked or discarded.

Additionally, the illustrative embodiments provide an efficient system to attach alignment structures and transmitting devices associated with alignment structures such that the transmitting devices remain in fixed locations. Accordingly, the configuration of the mandrel is determined more easily. Reducing the installation time of transmitting devices on the mandrel further reduces the manufacturing time for parts formed with the mandrel.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring a mandrel, the method comprising:
   positioning a first plurality of transmitting devices on the mandrel, each transmitting device of the first plurality of transmitting devices being configured to generate a signal indicative of a position of the transmitting device;
   receiving, at a receiving device, the signals indicative of the positions of the transmitting devices from a portion of the first plurality of transmitting devices;
   processing the signals indicative of the positions of the transmitting devices from the portion of the first plurality of transmitting devices to determine a current configuration of the mandrel;
   identifying a desired configuration for the mandrel;
   comparing the current configuration to the desired configuration; and
   when the current configuration does not match the desired configuration, modifying the mandrel such that the mandrel has the desired configuration, wherein the current configuration does not match the desired configuration when the mandrel has deformed such that a current position of one of the transmitting devices in the current configuration does not match a desired position of the one of the transmitting devices in the desired configuration.

2. The method of claim 1, wherein positioning the first plurality of transmitting devices comprises:
   embedding at least one of the first plurality of transmitting devices within the mandrel.

3. The method of claim 1 further comprising:
   positioning a second plurality of transmitting devices with respect to a tool;
   identifying a current position of the tool with respect to the mandrel using the signals received from the portion of the first plurality of transmitting devices and signals received from the second plurality of transmitting devices; and moving the tool to a desired position for the tool from the current position of the tool.

4. The method of claim 3 further comprising:

performing an operation on a part disposed on the mandrel with the tool based on the current position of the tool relative to the mandrel.

5. The method of claim 4, wherein performing the operation comprises performing one of a composite layup operation, a drilling operation, a fastener installation operation, a sealing operation, an inspection operation, a painting operation, a milling operation, a material application operation, and a sensing operation.

6. The method of claim 1 further comprising:

locating the receiving device in a reference location with respect to the mandrel.

7. The method of claim 6, wherein processing the signals from the portion of the first plurality of transmitting devices comprises:

determining an orientation of the mandrel.

8. The method of claim 7, wherein processing the signals comprises:

determining a shape of the mandrel.

9. The method of claim 8 further comprising:

determining, based on at least one of the orientation, a position, or the shape of the mandrel, whether to replace the mandrel.

10. The method of claim 1 further comprising:

positioning alignment structures on the mandrel configured to connect to the mandrel using attachment structures associated with the mandrel such that the alignment structures maintain a desired orientation for the mandrel.

11. The method of claim 1, wherein the current configuration does not match the desired configuration when the mandrel has deformed such that the current position does not match the desired position by more than a selected tolerance specified for the mandrel.

12. A system comprising:

a mandrel;

a first plurality of transmitting devices physically associated with the mandrel, each transmitting device of the first plurality of transmitting devices being configured to generate a signal indicative of position of the transmitting device; and a receiving device configured to receive the signals indicative of the positions of the transmitting devices from a portion of the first plurality of transmitting devices; and a controller operatively coupled to the receiving device and configured to process the signals indicative of the positions of the transmitting devices from the portion of the first plurality of transmitting devices to determine a current configuration of the mandrel, to identify a desired configuration for the mandrel, to compare the current configuration to the desired configuration, and, when the current configuration does not match the desired configuration, to modify the mandrel such that the mandrel has the desired configuration, wherein the current configuration does not match the desired configuration when the mandrel has deformed such that a current position of one of the transmitting devices in the current configuration does not match a desired position of the one of the transmitting devices in the desired configuration.

13. The system of claim 12, wherein a transmitting device in the first plurality of transmitting devices comprises at least one of a transceiver, a transmitter, a radio-frequency identification tag, a light-emitting diode, a transponder, or a laser.

14. The system of claim 12 further comprising:

a second plurality of transmitting devices physically associated with a tool; and wherein the controller is further configured to identify a current position of the tool using signals received from a portion of the second plurality of transmitting devices and move the tool from the current position to a desired position to perform an operation on a part associated with the mandrel.

15. The system of claim 14, wherein the tool is selected from one of a composite layup device, a drill, a camera, an ultrasonic array, a fastener installer, a sealant applicator, a painting device, a mill, a marking device, a laser, a probe, a material applicator, and a sensor.

16. The system of claim 12, wherein the signals from the portion of the first plurality of transmitting devices provide data from which information about at least one of a shape, an orientation, and a position of the mandrel can be generated.

17. The system of claim 12 further comprising:

attachment structures associated with the mandrel; and alignment structures positioned along a surface of the mandrel and configured to connect to the mandrel using the attachment structures such that the alignment structures maintain a desired configuration, wherein each transmitting device in the first plurality of transmitting devices is associated with one of the alignment structures.

18. The system of claim 12, wherein each transmitting device in the first plurality of transmitting devices comprises a transceiver configured to communicate with other transceivers associated with the mandrel.

19. The system of claim 12, wherein the receiving device is mounted on a tool.

20. The system of claim 12, wherein the current configuration does not match the desired configuration when the mandrel has deformed such that the current position does not match the desired position by more than a selected tolerance specified for the mandrel.

21. A method for monitoring a current configuration of a mandrel, the method comprising:

attaching a plurality of transceivers to the mandrel, each transceiver of the plurality of transceivers being configured to generate a signal indicative of a position of the transceiver;

receiving, at a receiving device, the signals indicative of the positions of the transmitting devices from a portion of the plurality of transceivers;

processing the signals indicative of the positions of the transmitting devices to determine the current configuration of the mandrel;

comparing the current configuration of the mandrel to a desired configuration for the mandrel; and replacing the mandrel when the current configuration does not match the desired configuration, wherein the current configuration does not match the desired configuration when the mandrel has deformed such that a current position of one of the transmitting devices in the current configuration does not match a desired position of the one of the transmitting devices in the desired configuration.

22. The method of claim 21, wherein the current configuration does not match the desired configuration when the mandrel has deformed such that the current position does not match the desired position by more than a selected tolerance specified for the mandrel.

\* \* \* \* \*